US012336946B1

(12) United States Patent
Jafari

(10) Patent No.: US 12,336,946 B1
(45) Date of Patent: Jun. 24, 2025

(54) SYSTEM AND METHOD FOR PROVIDING A MOTORIZED AND MODULAR AUTOMATED HIGH-RESOLUTION MATTRESS AND MATTRESS-BED ASSEMBLY FOR PREVENTION AND HEALING BED SORES

(71) Applicant: Seyed Mohammadreza Jafari, Unionville (CA)

(72) Inventor: Seyed Mohammadreza Jafari, Unionville (CA)

( * ) Notice: Subject to any disclaimer, the term of this patent is extended or adjusted under 35 U.S.C. 154(b) by 0 days.

(21) Appl. No.: 18/791,597

(22) Filed: Aug. 1, 2024

Related U.S. Application Data

(60) Provisional application No. 63/608,337, filed on Dec. 11, 2023.

(51) Int. Cl.
*A61G 7/05* (2006.01)
*A61G 7/057* (2006.01)

(52) U.S. Cl.
CPC ........ *A61G 7/0573* (2013.01); *A61G 2203/34* (2013.01)

(58) Field of Classification Search
CPC .......... A61G 7/00; A61G 7/05; A61G 7/0573; A61G 2203/34
See application file for complete search history.

(56) References Cited

U.S. PATENT DOCUMENTS 5,446,933 A * 9/1995 Gabelhouse ......... A47C 23/065 5/729
6,721,981 B1 * 4/2004 Greenhalgh ......... A47C 23/002 5/264.1
7,069,610 B1 * 7/2006 Chai .................... G01G 19/445 177/144
7,251,845 B2 * 8/2007 Schaller ................. A61B 5/103 5/616
8,572,783 B2 * 11/2013 Moutafis ............ A61G 7/05769 5/710
2008/0034501 A1 * 2/2008 Hyde ................. A61G 7/05707 5/613
2012/0259248 A1 * 10/2012 Receveur ................ G16Z 99/00 600/595
2013/0019408 A1 * 1/2013 Jacofsky ................ A61B 5/447 5/613
2015/0351982 A1 * 12/2015 Krenik ................... A47C 23/06 5/616

* cited by examiner

*Primary Examiner* — Fredrick C Conley
(74) *Attorney, Agent, or Firm* — Nasser Ashgriz; UIPatent Inc.

(57) ABSTRACT

The present invention is a modular mattress assembly that can prevent the appearance of bed sores and can heal the developed sores by spreading the weight of the body on the mattress using an array of motorized support. The modular mattress is an array of small cushionettes each placed on top of a linear motion mechanism. Each cushionette can be adjusted in height independently of any other cushionettes through the electrical linear motion mechanism. This actively adjustable array mechanism of the mattress which can extend infinitely in Z-axis through motorized linear actuator brings a high resolution of the shape of the mattress. The array can change position in XYZ axis to accurately accommodate the patients medically required shape and skin contact points. The device uses predefined and amended algorithms to adapt the patients' situations individually or provide personalized treatment.

14 Claims, 24 Drawing Sheets

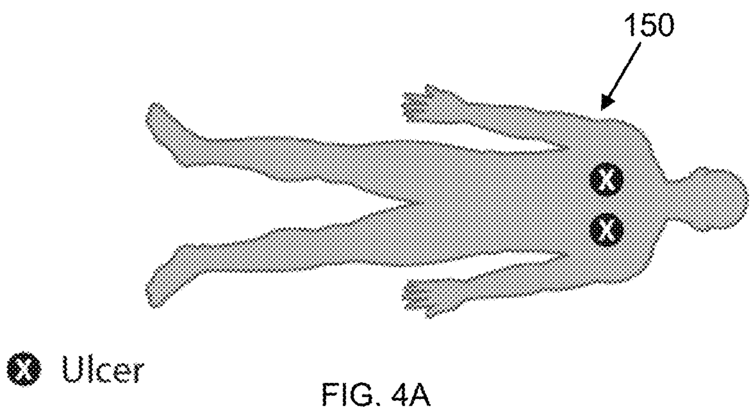
FIG. 4A
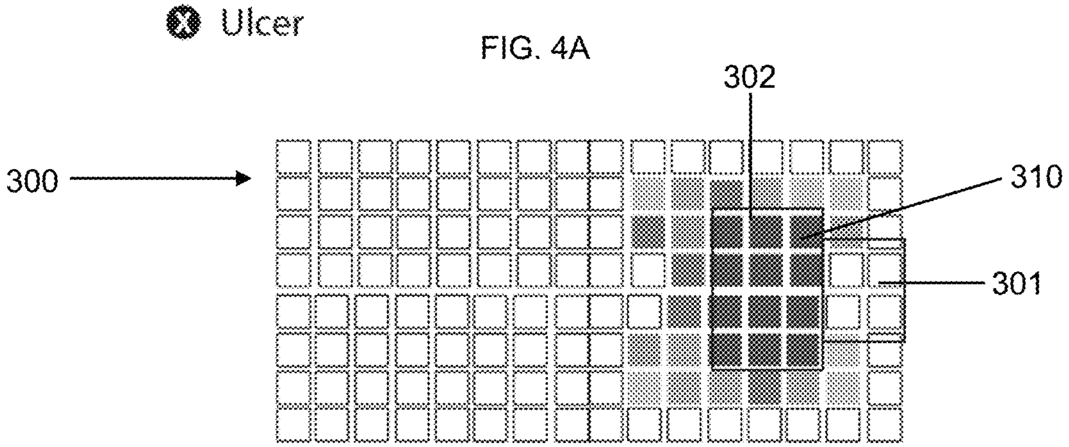
FIG. 4B
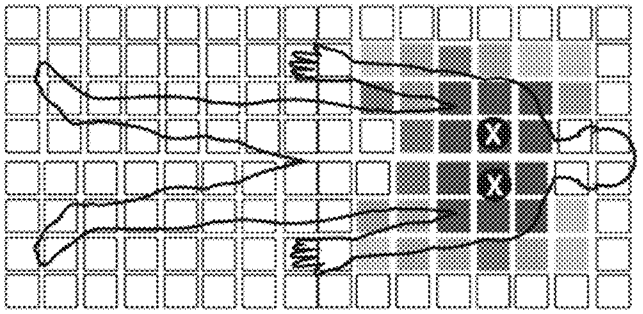
FIG. 4C
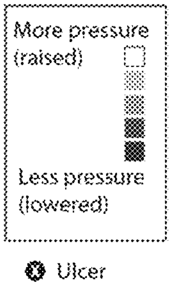

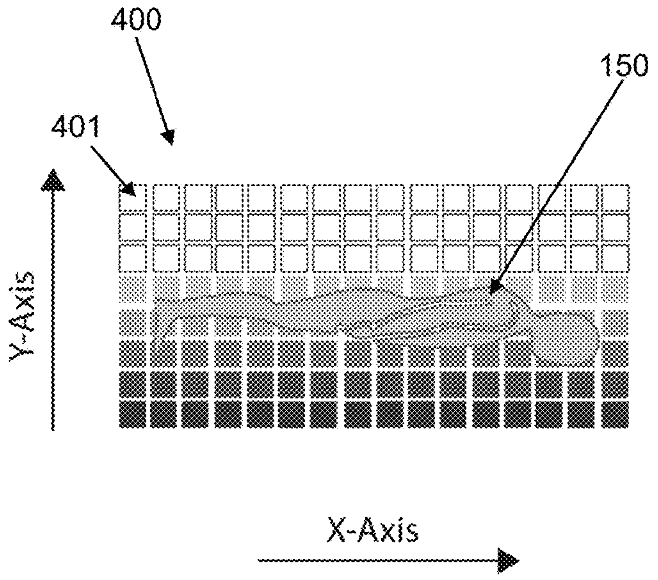
FIG. 5A
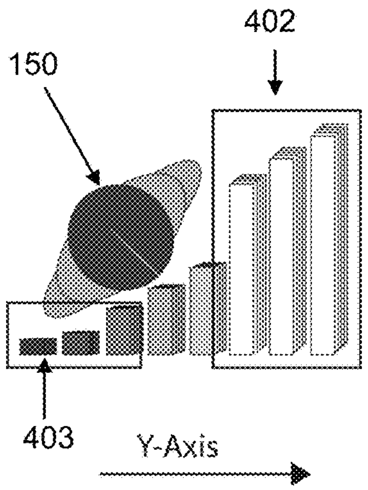
FIG. 5B
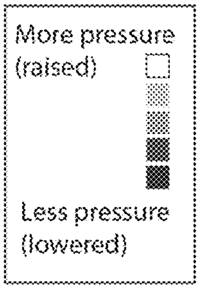

SYSTEM AND METHOD FOR PROVIDING A MOTORIZED AND MODULAR AUTOMATED HIGH-RESOLUTION MATTRESS AND MATTRESS-BED ASSEMBLY FOR PREVENTION AND HEALING BED SORES

CROSS-REFERENCE TO RELATED APPLICATIONS

This application claims the priority date of provisional patent application No. 63/608,337 filed on Dec. 11, 2023, which is incorporated herein by reference in its entirely.

FIELD OF THE INVENTION

The present invention relates generally to a new type of a point-of-care in-patient or out-patient medical bed and specifically to an automated smart bed-mattress assembly configured to prevent and heal pressure ulcers (bedsores), muscular atrophies and other complications arising from immobility in fully or partially disabled patients by programmed movement of individually motorized mattress modules.

BACKGROUND OF THE INVENTION

Decreased mobility or total immobility in patients with various health conditions results in several progressive complications that degrades the patient's health and the quality of life: the bed sores, skeletal muscular atrophies, deep vein thrombosis (DVT), decreased respiratory function, fungal infections, etc. When active mobility or daily exercise is not an option, an assisted-moving mechanism can help avoid all or most of the resulting health conditions. In cases where the patient is in palliative conditions, in patients with severe neurological/skeletal problems and in patients with debilitating congenital conditions, preventing such complications can increase the quality of life for the individual and avoid or delay morbidity due to deteriorated movement.

The bed sore or pressure ulcers happen when areas of the skin of an immobilized person are in contact with a surface for a long period of time, thus prolonged exposure of skin to the surface must be avoided. Bed sores are highly prone to infection, difficult to heal after developing and can result in high morbidity and mortality rate, especially among older adults, thus the best treatment is to prevent its development. Depending on the condition and the care, the bed sores can develop fast but take weeks to years to heal, if ever, thus once a person affected the ulcer should be healed completely. They can occur on the buttocks area (on the tailbone or hips), heels of the feet, shoulder blades, back of the head, backs and sides of the knees, thus a high spatial resolution system is needed where it can address surface exposure to different parts of body.

The other important aspect in dealing with bed sores is precision targeting the lesion that is developing (XY plane). Usually, bedsores start with a patch of 1"×1" and then propagate through the skin. An effective system should be able to reduce the pressure exactly at the lesion developing area. However, inflatable mattresses are made of too few modules to be able to change the pressure in a small area. A typical inflatable module (air cell) has a width of 4" and a height of 3"-4". This system is highly inefficient when an ulcer of 1"×1" is developing at the area. Because of large dimensions of the inflatable modules and lack of control, there constantly are parts of the skin that are always in contact with the mattress with high pressure.

In cases of short-term immobility in individuals with injuries or treatment which requires mid-long term bedrest, the skeletal muscles may start deteriorating in a process called macular degeneration. Not only is the process painful, but it can result infection, kidney problems, vascular complications and reduced mobility after discharge; thus, the system should be able to move the muscles periodically with the ability to address each limb and move the muscles as much as possible. Assisted exercise can highly benefit the quality of care within the treatment time and after that.

In patients with short term immobility, such as major bone fracture or tumor surgeries which requires weeks of immobility in bed, an "assisted moving system" can keep the skeletal muscles active and prevent bed ulcers, fungal infections and pain resulting from lysis of non-moving muscles. Often times persons with short term immobility need weeks of rehabilitation due to lack of movement for a long time.

In the individuals who are immobilized on bed for a long time, the heat and moist that accumulates between the skin and the resting surface provide an ideal environment for bacterial and fungal infection, thus, the system must be able to provide (preferably) active passage of air between the skin and the surface to keep it dry and clean.

Often time immobilized persons are seated on a wheelchair for a long time to be able to perform daily routines, such as feeding and outgoing. Therefore, the system must be compatible to any type of surface provided for the individual including beds, chairs and wheelchairs.

The ineffectiveness of current air inflatable alternating pressure systems are undeniable. As Nixon et. al. (EClinicalMedicine 14 (2019) 42,52) reported in 2019, they found insufficient evidence of a difference in time to bed sore development at 30-day trial, even with "high-tech" mattresses. In a comprehensive review that comprised 2833 patients, published in 2021, Shi et al (Cochrane Database Syst Rev. 2021; 2021 (5): CD013620) found no difference in the risk of developing of bed sores between different types of alternating pressure air surfaces. In a more recent systematic review, Kim et al (2022 April; 19 (2): 94-99) found there is not sufficient evidence that suggests that APMs are more effective in preventing PIs than regular mattresses.

A major drawback of the existing systems is that the air inflatable alternating pressure mattress assumes limited shapes in order to spread the weight. For example, air mattresses only change the shape depending on the air channels that are embedded in the design which barely exceeds more than two. They are not adaptive to the patients' specific body shape/weight and are not aware of current patient's position. They have no logged memory of the shapes the mattress assumed throughout a certain period of time (a day, a month, a quarter) and there is no feedback mechanism to measure the weight of the patient and contact surface. Therefore, they cannot automatically and intelligently find the best configuration of the surface for the patients.

There have been efforts to improve the efficiency of air inflatable mattresses. For example, U.S. Pat. No. 11,058,603 B2 shows an air inflatable system with pressure sensing and mechanisms to adjust the pressure for individual air cells. However, it lacks pressure adjustment in Z axis and cannot adjust the pressure on par with a motorized system that can adjust the height in micrometers. Patent WO 2015/148223 A1, describes a mattress made of an array of electroactive polymer actuator (EPA) with a feedback mechanism. While this system provides the advantage of designer shape for a specific body shape, it lacks the dynamic range in Z-axis. The actuators are expandable in a range of only +/−635 cm to +/−1.27 cm, while motorized dynamic range is theoretically infinite. The low dynamic range of EPA is intrinsic to the cathode/anode distance interaction efficiency, thus cannot be improved dramatically. Imagine a patient with a weight of 120 Kg is lying on an EPA based matters. The hips and the heels carry the weight and the leg pit could be well over 2 cm raised from the mattress. Therefore, a 1.27 cm change in dynamic range is barely helpful.

Jacofsky and Jacofsky in the U.S. Pat. No. 10,368,796 B2 describe a mattress with an array structure, however, the elevation of the cushionettes is controlled by a flowable material like a gas or fluid, and therefore lacks accuracy. The motion of the cushionettes (air cells, air blocks) are not motorized.

Also, the current alternative pressure mattresses and exoskeletons are not meant to address multiple conditions at the same time and are ineffective or require presence of highly trained health professionals to be used for alternate use such as positioning the patient's body for cleaning and higher-level movements (e.g., preventing DVT).

Conventional APMs use inflatable segments to make a "bumpy" pattern on the weight carrying surface which switches between limited number of patterns. The problem is that the current air inflatable designs work based on air pressure that cannot be accurately controlled in a simple manner, therefore having low precision in the height of the "bump". In addition, current air inflatable designs lack a feedback mechanism to report the weight carried by each air cell and lack a means to re-adjust the pressure subsequently. The problem is exacerbated when there is no mechanism to adjust the pressure of each air cell independently even if a feedback signal is received, due to complications and high cost of pneumatic valves. This is problematic because if the height of the surface is constantly too high regardless of the pattern (consequent of no precision) the skin would be constantly exposed to the surface at all times.

SUMMARY OF THE INVENTION

The present invention discloses a system and method for providing a motorized and modular automated high-resolution mattress and mattress-bed assembly for prevention and healing bed sores. The system comprises a mattress and a bed-mattress assembly that can prevent of bed sores and can heal the developed sores by spreading the weight of the body on the mattress using an array of motorized support. The system has a high spatial precision and high dynamic range in shape. A combination of moving individual mattress modules can address each limb or any part of the body, performing complex movements such as alternating pressure, lifting one or multiple limbs for assisted exercise, rolling or sliding the patient's body and other types of movements. The system can benefit from predefined algorithms or learn by training Artificial Intelligence to adapt the patients' situation individually or to provide personalized treatment. The present invention is an active system that adjusts the points of contact through feedback and re-adjusts the spread of pressure on the total area of the mattress.

The present invention comprises of an array of electronic independently moving linear actuators in high numbers, thereby making a high-resolution mattress that can assume optimal topography by taking measurements via the motor itself or other various sensors. The system can analyze the result of its previous actions and learn to improve the surface pattern to perfection in order to prevent or heal bed sores. This array mechanism is not specific to a bed assembly and can be used for any device where immobilized patient can develop a bed sore, including but not limited to wheelchairs. The array of the motion compartments spread the pressure on the patients and move the patient's body e.g. elevating, rolling, bending, etc. for various care actions such as bathing, feeding, massaging and exercise to prevent muscle loss.

The function of the invention is to actively spread the pressure that is imposed by the body weight onto the skin, so that the blood stream can flow seamlessly or with reduced blockage to the dermal tissue, therefore preventing bed sores. The alternate pressure system is designed to measure the weight and accurately adjust the height of the bump (Z axis) rather than passive inflation to a certain point periodically. This is only achievable with advanced electronics and sensors which can measure the pressure and adjust the height to micrometer level.

Currently the most common automated way of preventing bed sores is using air inflatable alternate pressure mattresses (APMs). The mechanism used by APMs is to change the shape of the mattress in defined intervals so that no part of the skin is exposed to the mattress surface constantly. One mechanism of such shape change is to make channels in the mattress and pump air intermittently in the channels so as to make inflated and deflated cells in a defined pattern. This mechanism results in exposing certain parts of the mattress to the skin at a given time (FIG. 1A) and intermittent distribution of the weight of the body between each cell. The problem with such system is that there are only two alternated shapes that the mattress can assume and each shape takes a large area, resulting in non-specificity of the shape of the mattress to the patient's body.

The solution to this problem is to break down the contact points to smaller pieces so that the pressure on smaller areas can be controlled with high precision. The specificity can be achieved by assembling an array of small support modules (cushionettes) on the XY plane utilizing motorized precision movement actuators instead of large air channels. Smaller number of contact points results in higher resolution of the pressure areas. This system overcomes the problem by:

- increasing the number of contact points (cushionettes) and therefore providing higher control in area unit (XY plane);
- Receiving feedback from the built-in sensor that can measure the weight carried by each cushionettes;
- Adjusting the height (the bump) precisely so that a certain amount of weight is laid on each cushionettes. (Z axis)

In APMs, depending on the shape of channeling, alternate pressure is applied to the whole or certain parts of the body. Common hospital beds can provide a limited degree of freedom by elevating the head or feet area of the bedframe through actuators. However, these mechanisms are independent of the mattress and typically move a large part of the bedframe. The bed provides large movement of the body (bending) and the mattress provides surface change. Also, the air inflation mechanisms are actively inflating and deflating the mattress but through a fixed, preprogrammed pattern, with an "one fits all" approach.

This additional shortcoming of current APMs results in lack of "resolution" and "awareness" about the exposed area. The current APMs change the pressure surface passively, meaning that they do not know what part of the mattress is exposed to the skin and to what extent, taking a strategy of "one-solution-fits-all". The skin surface exposed to the inflated cell depends on the location and the position of the patient on the bed which is not predefined.

The change in the surface or the shape of the mattress happens according to a pre-programmed pattern that is often time irrelevant to the affected area. If the patient is positioned on the mattress so that the alternating shape is not changing the pressure in certain areas, it starts to develop the sore no matter how many times and to what extent the mattress changes the shape. Therefore the "awareness" of the system regarding the body location and position is essential to actively decide what part of the mattress must change pressure. This awareness must result in the system "thinking" and yielding a surface pattern changes for a specific individual with specific weight positioned on a specific plane of the mattress.

Additionally, the common way for alternating pressure is to inflate air cells of the mattress through air channels (FIG. 1A). The common number of the air channels is two, resulting in only four states of pressure, all inflated, all deflated, only channel A inflated and channel B deflated, only channel A deflated and channel B inflated. This yields a resolution of only three shapes (FIG. 1A-FIG. 1C) which is not sufficient for preventing or healing potential pressure ulcers, as they may show up in various location of the body. The patient needs a system which can decide how much pressure, to what area and for how long to apply, in high resolution, using sensors to follow up and learn to improve the pressure pattern.

The present invention provides an intelligent high efficiency "patient specific" solution for preventing and healing bed sores. The high resolution in the shape of the mattress can result in a highly optimal distribution of weight and therefore "personalized" care. The mattress and the mattress-bed assembly are aware of the location and the extent of the touch between the skin and the surface through sensors (camera, piezo, thermometer, hygrometer, etc.) or by native current feedback to the motors or any other technology that provides such means.

In embodiments, a pressure monitor can be configured to transmit measured pressure data to a networkable device (e.g., a laptop computer, PDA, cell phone, a processor located in the bed, or other patient monitor). The networkable device can then send a signal to actuators located within the bed to adjust the pressure of one or more sections in the support surface of the bed. The networkable device can additionally communicate the user's status and condition to a healthcare provider station (e.g., staffed by nurses, doctors, and other hospital personnel) or directly to a healthcare providers' wireless networkable device (e.g. cell phone, pager, or personal digital assistant (PDA)) through a communication network such as a local area network (LAN), wide area network (WAN), or the like. This communication allows the healthcare provider to remotely monitor a user, such as a hospital patient and take action when certain conditions are indicated.

The present invention is a novel mattress system that can be used in hospitals for immobilized patients who are bedbound for a prolonged time due to various conditions such as accidents, falls, surgeries, loss of consciousness, etc., or in households where the family is providing care to immobilized patients and elderly.

Bed sores are a serious problem in hospitals, senior care facilities, end-of-life care facilities and even in households who take care of an immobilized patient, thus the system must be operable with or without the presence of health professionals to operate it. Preventing bed sores can save millions of lives and billions of dollars annually. The only method to prevent bed sores is to make sure a certain surface of skin is not under pressure (body weight) for a long time; However, immobilized patients cannot move their body or the limbs to keep a healthy blood stream; thus, the system must have a high dynamic range of movement to move the patient's body and spread the weight from time to time.

The invention can prevent formation of ulcers that are caused by prolonged pressure on a certain part of the body with accuracy. The system will increase the quality of life of the patient and provide relief to the healthcare system by decreasing the occurrence of bed sores, the time and cost that must be spent towards the prevention, healing and further interventions. This system is expected to significantly decrease the morbidity and mortality caused by the development of pressure ulcers and immobilized muscles that can rapidly propagate to other areas of the body. The system also relieves the caregivers from constantly monitoring the status of the patient's skin condition, therefore reducing the exhaustion of extensive care for disabled or immobilized patients.

Therefore, it is an object of the present invention to alternate the pressure on the patient's skin through movement of electronic motorized small modules that make the entirety of an alternating pressure mattress.

It is another object of the present invention that can actively measure the exposure time and pressure through a feedback mechanism and decide what part of the mattress should change pattern for a specific patient with a specific body shape.

It is another object of the present invention to provide a high resolution in the alternating surface, to bear a high precision in adjusting the height of each support, thus, high resolution in pressure adjustment and high dynamic range in moving the body support, therefore performing more complex body movements.

It is another object of the present invention that can measure the result of the previous status and learn to improve the alternating pressure algorithm.

It is another object of the present invention that has the potential to prevent and heal the sore via the ability to accommodate various sensors and mechanisms connected to a real-time patient monitoring system.

It is another object of the present invention to provide assistance in moving limbs or parts of the body (bending, rolling over, sitting, laying, etc.), through the same support array of the mattress, independent of the bedframe, when the motorized actuators are allowed to extend from micrometers (surface shape change) to tens of centimeters (body shape change), in order to provide skeletal movement to fight complications resulted from immobilization.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 1F-11 (Prior art) shows an enhanced type of conventional air inflatable mattress with dual air channels (resolution 4);

FIG. 4A is a view of a patient showing the bed sore areas;

FIG. 4B is a schematic view of the motorized array of cushionettes showing how the motorized array of cushionettes adjusts the pressure based on the location of the ulcer;

FIG. 4C is a schematic view of a patient on the motorized array of cushionettes showing how the motorized array of cushionettes adjusts the pressure based on the location of the ulcer;

FIG. 5A shows a top view of the topography of the motorized mattress for rolled-over body position, according to the present invention;

FIG. 5B shows a front view of the rolled-over position, according to the present invention;

FIG. 7 shows a basic unit of a motorized mattress-bed assembly, according to the present invention;

FIG. 8 shows a motorized mattress-bed assembly containing multiple sensors and monitoring systems, according to the present invention;

FIG. 9 is a block diagram of an illustrative network for monitoring one or more pressure sensors for adjusting a support surface to accommodate for changes in pressure, in accordance with an embodiment of the present invention;

FIG. 11 is a flowchart showing how the motor can measure the pressure of contact between a single linear actuator and the patient's body;

DETAILED DESCRIPTION OF PREFERRED EMBODIMENTS

In conventional APM (Alternating Pressure Mattress) systems, the alteration of mattress shape is typically achieved by creating channels within the mattress and periodically pumping air into these channels to generate inflated and deflated cells following a predefined pattern. However, a significant limitation of these systems lies in their inadequate "resolution" and "awareness" concerning the exposed area. Present APMs passively modify the pressure surface without discerning which portions of the mattress are in contact with the skin or to what degree, thereby employing a generalized "one size fits all" approach.

Figures 1A, 1B, 1C:
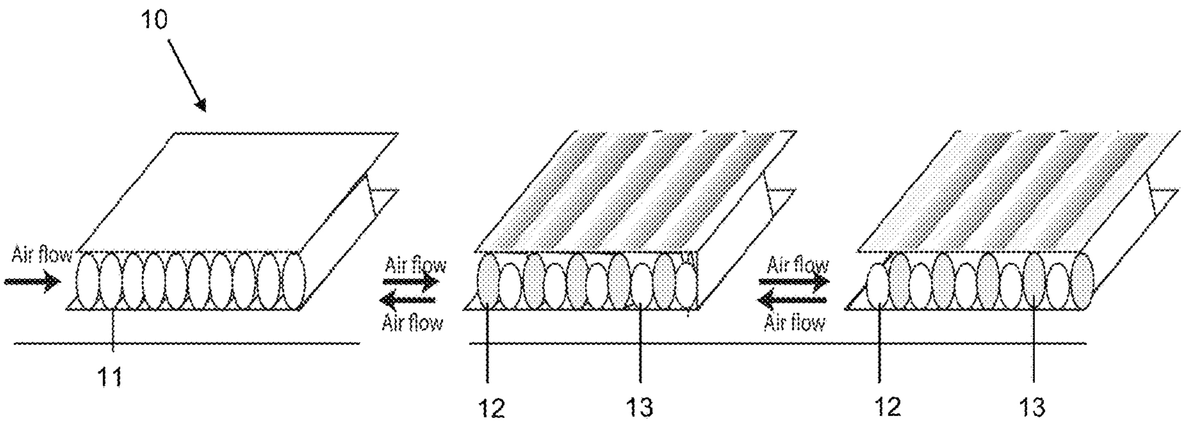
FIG. 1A-1C (Prior art) shows the mechanism of a conventional alternative pressure air inflatable mattress in which the shape of the surface of the mattress changes by pumping air through channels.

In FIG. 1A to 1I, a conventional air inflatable mattress 10 is depicted, illustrating the mechanism by which the surface shape transforms via air pumped through channels 11. Typically, in FIGS. 1A and 1B there are two group air channels, group A and B, yielding only four pressure states: all channels inflated (FIG. 1A), all channels deflated (not shown), channel group A as shown with reference number 12 inflated while channel group B as depicted with number 13 deflated (FIG. 1B), and channel group A-12 deflated while channel group B-13 inflated (FIG. 1C).

Figure 1D:
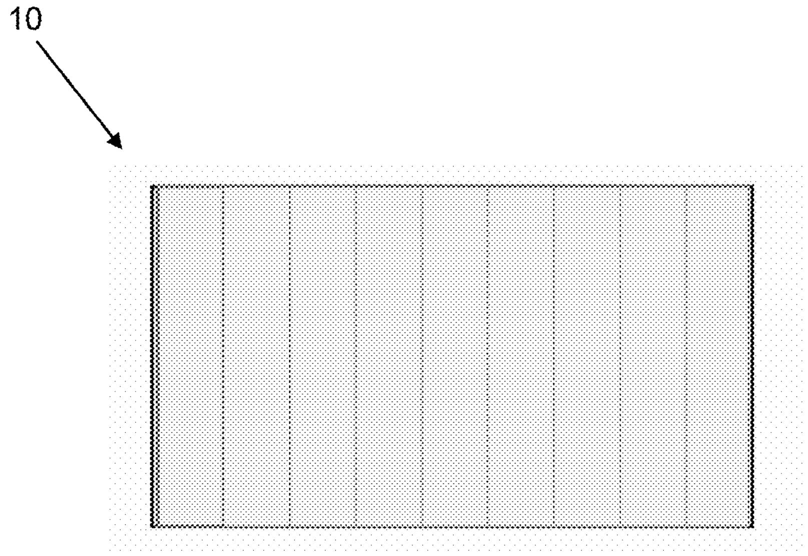
FIG. 1D-1E (Prior art) shows a conventional air inflatable mattress (resolution 2)
Figure 1E:
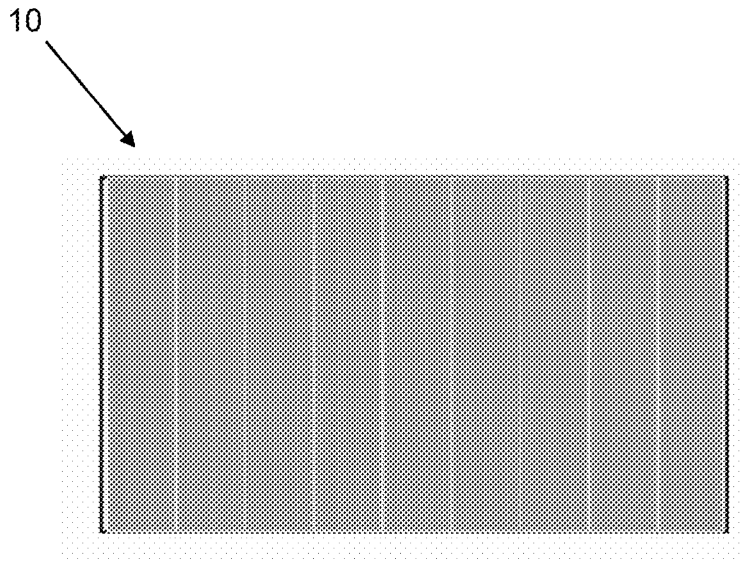
Figure 1F:
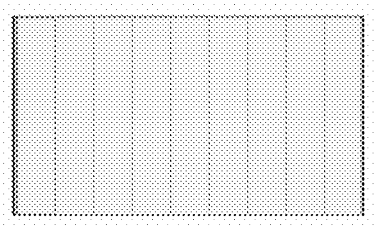
Figure 1G:
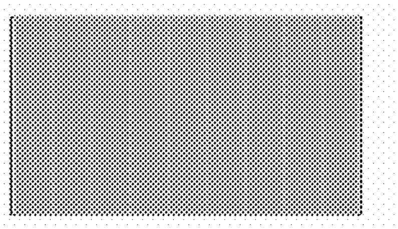
Figure 1H:
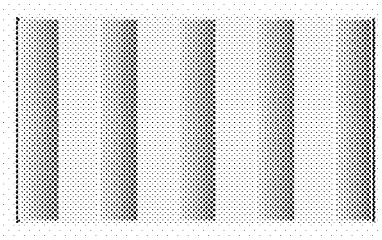
Figure 1I:
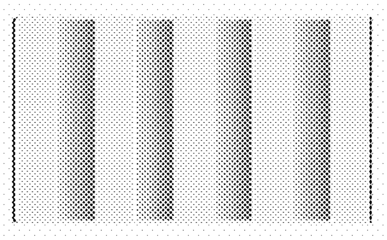

FIGS. 1D and 1E disclose a Conventional air inflatable mattress, yielding two pressure states: all inflated mattress (FIG. 1D) or none inflated mattress (FIG. 1E) (resolution 2). FIGS. 1F to 1I show an enhanced type of inflatable mattress with dual air channels (resolution 4) which is not sufficient for preventing or healing the pressure ulcers, as they may show up in various location of the body. The channels may be in following states: both channels deflated non-raised cushions (FIG. 1F), both channels inflated raised cushions (FIG. 1G), one channel raised cushions and the other one deflated (FIG. 1H) and one channel alternatively inflated raised cushions and the other one deflated (FIG. 1I).

The surface area of the skin exposed to the inflated channels depends on the patient's position and location on the bed, variables that are not predetermined. Consequently, the adjustment in mattress surface or shape adheres to a pre-established pattern that is often irrelevant to the specific affected region. If the patient's position on the mattress does not align with the alternating shape, the risk of developing ulcers persists regardless of the frequency or extent of mattress shape changes. Therefore, a system is needed that can precisely determine the optimal pressure to apply, the specific locations for application, and the appropriate duration. This system should incorporate high-resolution sensors to continuously monitor and adapt the pressure patterns for improved performance.

Figure 2A:
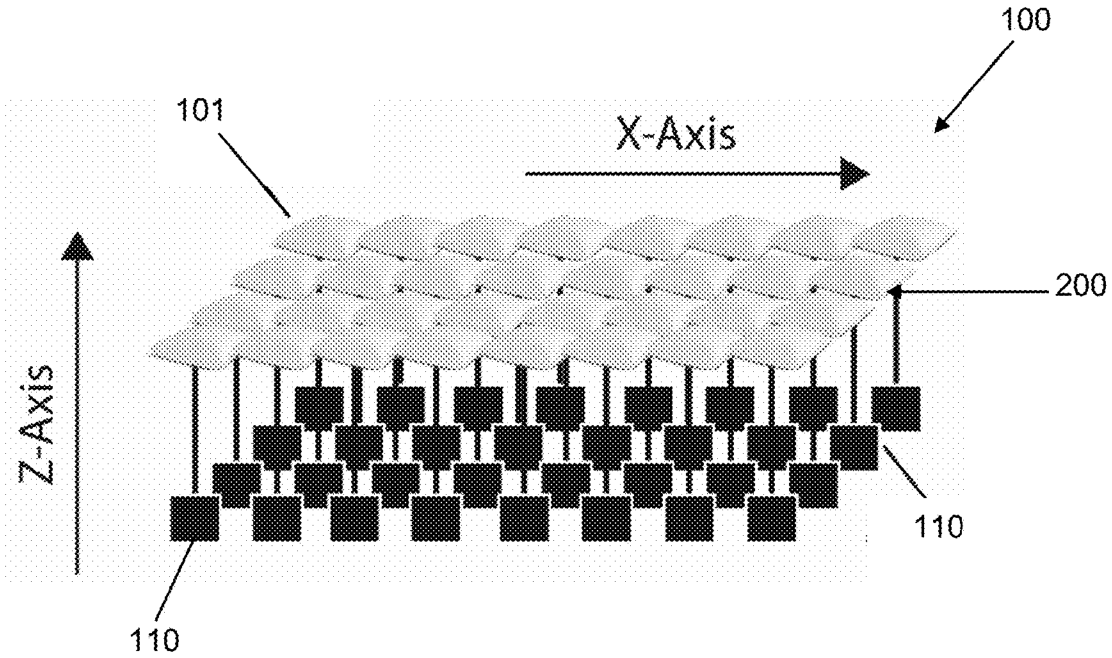
FIG. 2A shows an array of motorized system (an example of 4×8 cushionettes, resolution: 32) in which all cushionettes are raised, according to the present invention.

FIG. 2A is a perspective view of the motorized system 100 comprising a support surface 200. The support surface 200 comprises of an array of motorized cushionettes 101.

The support surface 200 is composed of a plurality of motorized linear motion actuators 120. Each motorized linear actuator 120 consists of an upright shaft 103 with a distal end 111 connected to a cushionette 101 and a proximal end 112 coupled to a motor 110. The motion of the support surface 200 of the motorized system 100 is facilitated by these linear motion actuators 120. Each cushionette 101 is positioned on top of a linear motion actuator 120, allowing the height of each corresponding cushionette 101 to be adjusted. The motor 110 can independently raise or lower each cushionette 101, thus elevating or lowering the part of the body with a bedsore to alleviate pressure and disconnect the affected skin from the mattress.

The motorized system 100 can be used in one of many forms, including but not limited to, a bed including a mattress and bed frame, such as a hospital bed configured for use during or after medical procedures, a conventional bed used for sleeping, a mattress for a bed, a mattress cover configured to be placed on top of a mattress, a chair such as a wheelchair, couch, or any other suitable device.

In some embodiments, each of linear motion actuator 120 and the correspondent cushionette 101 are in the shape of a square and are arranged to form a square grid. In other embodiments, The linear motion actuator 120 and the corresponding cushionette 101 can be in a shape other than a square. For example, a non-square rectangle, an oval, a sphere, a cylinder, or any other suitable geometric shape.

Each cushionette 101 can be adjusted in height independently of the others through electric signals controlled by an electrical motor 110. The combined adjustment of the cushionettes 101 form a shape that optimally supports the weight of the patient. The weight applied on each cushionette 101 is measured by using motors feedback system. The weight applied on each cushionette 101 can further be measured using other input devices.

Each motorized linear actuator 120 can be powered by an electric or magnetic motor 110, which may include but is not limited to a DC motor, a servo motor, or a stepper motor. These motors are coupled to the linear actuator 120 that can include but is not limited to a lead-screw/nut, geared lead-screw/nut, hydraulic motion, motion belt, chain-driven motion, magnetic motion, etc. The mechanism for motor-induced motion can vary mechanically, magnetically induced rotary motion, magnetic linear motor, etc. Each motor 110 can raise or lower one or multiple cushionettes 101 by several meters or as small as micrometers, resulting in a precise surface topography that optimally distributes the patient's weight. Additionally, motor 110 can employ various methods, such as gearing or position shifting, allowing one motor to adjust the height of multiple independent cushionettes 101. FIG. 2A shows the initial assembly of the motorized system, while all cushionettes are raised and the system is in an inactive position.

Figure 2B:
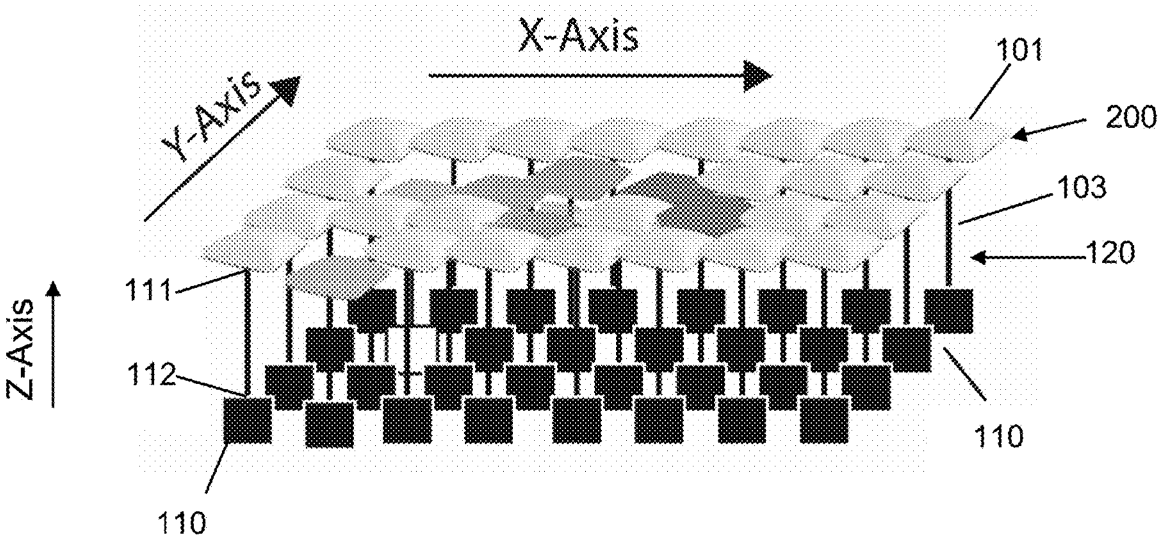
FIG. 2B shows an array of motorized system (an example of 4×8 cushionettes: resolution: 32), in which motorized linear actuators can change the height of each cushionette to apply certain pressure in high precision on Z axis, according to the present invention.

FIG. 2B shows an embodiment of a motorized system of the present invention comprising an array of 4×8 cushionettes (resolution 32) with alternatively raised cushionettes. The motorized linear actuators 120 can change the height of each cushionette to apply certain pressure in high precision on Z axis. Since each cushionette 101 is controlled independently from the other cushionettes, the topography of the support surface 200 can be managed with high and specific resolution. The motorized linear actuators 120 can change the height of each cushionette to apply certain pressure in high precision on Z axis.

The "resolution" of the support surface 200 is determined by the number of cushionettes 101 that contains the support surface 200. For instance, an array of 4×8 cushionettes, as shown in FIGS. 2A to 2F will create a support surface 200 that can be controlled at 32 points. The higher the resolution of the support surface 200, the smoother its shape and the more effective the control. This actively adjustable array mechanism of the mattress, which can extend infinitely in the Z-axis through motorized linear actuators 120, introduces novelty by increasing the resolution of the mattress shape. As shown in FIG. 1A, in conventional APMs, all air channels 11 can only be raised or lowered in four fixed formats, limited by the elasticity of the channel material and the air pressure within each channel.

Figure 2C:
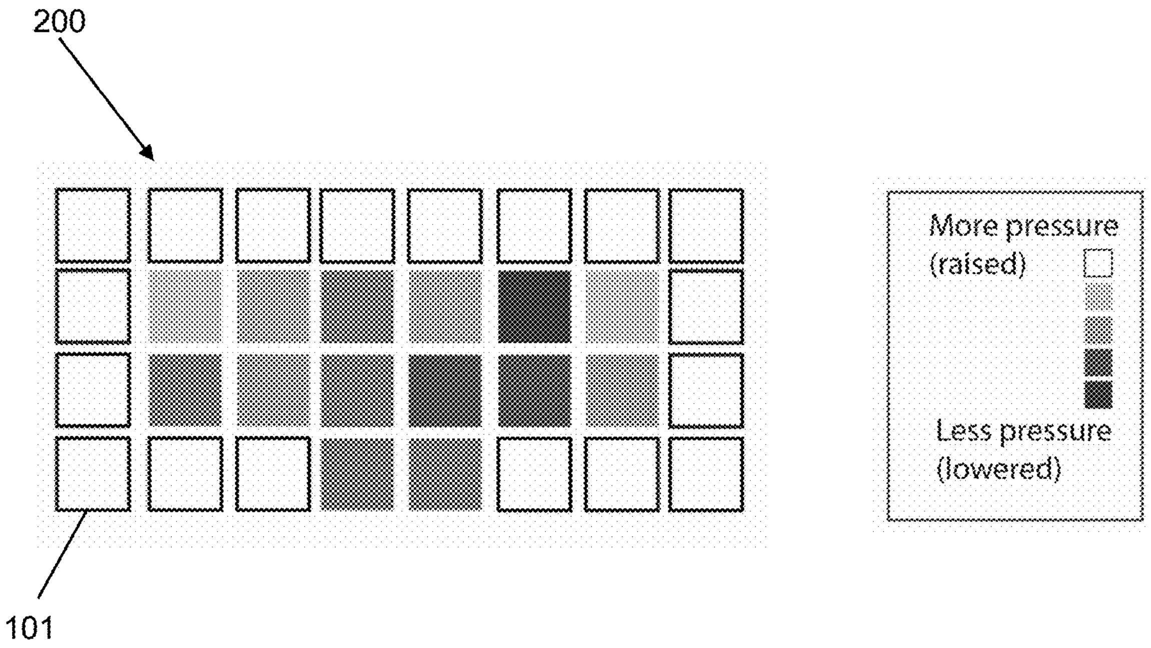
FIG. 2C is a schematic view of the actively changing mattress top view showing an array of motorized system (an example of 4×8 cushionettes: resolution: 32)

FIG. 2C shows a top view of the support surface 200 with alternatively raised cushionettes (Resolution 32). The linear actuators 120 can change the height of each cushionette 101 to apply precise pressure on the Z-axis, allowing the mattress 100 to assume thousands of shapes.

Figure 3A:
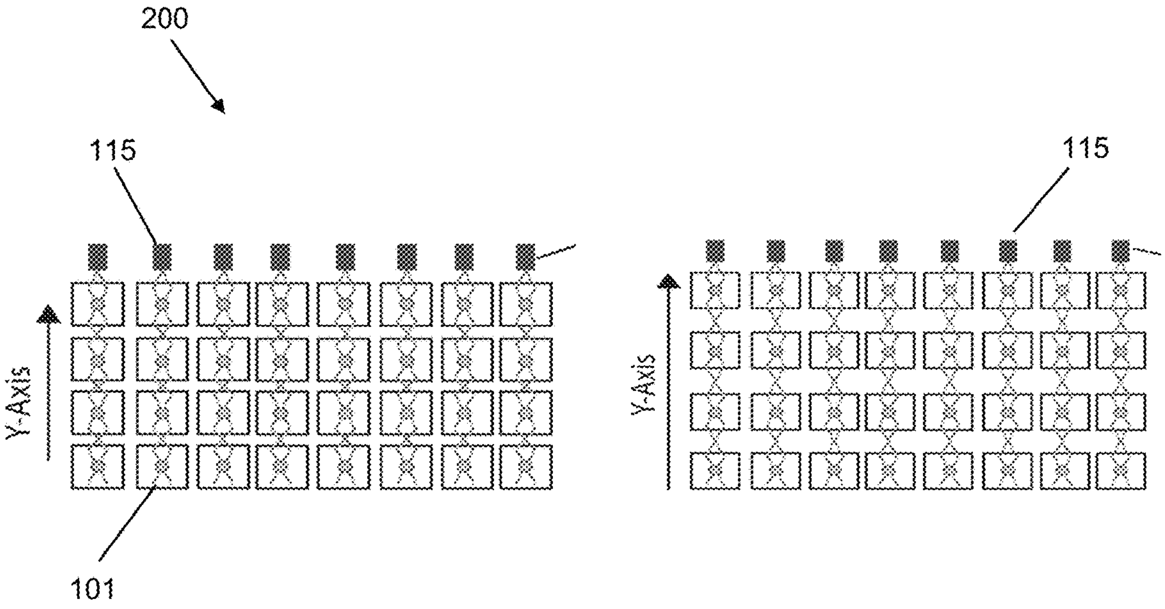
FIG. 3A shows an array of motorized system (an example of 4×8 cushionettes: resolution: 32) in which the array can expand in Y axis.
Figure 3B:
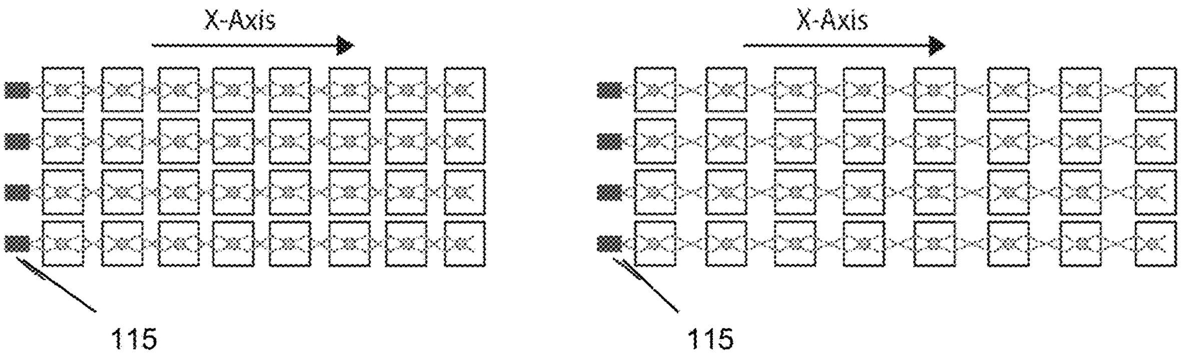
FIG. 3B shows an array of motorized system (an example of 4×8 cushionettes: resolution: 32) in which the array can change length in X axis.
Figure 3C:
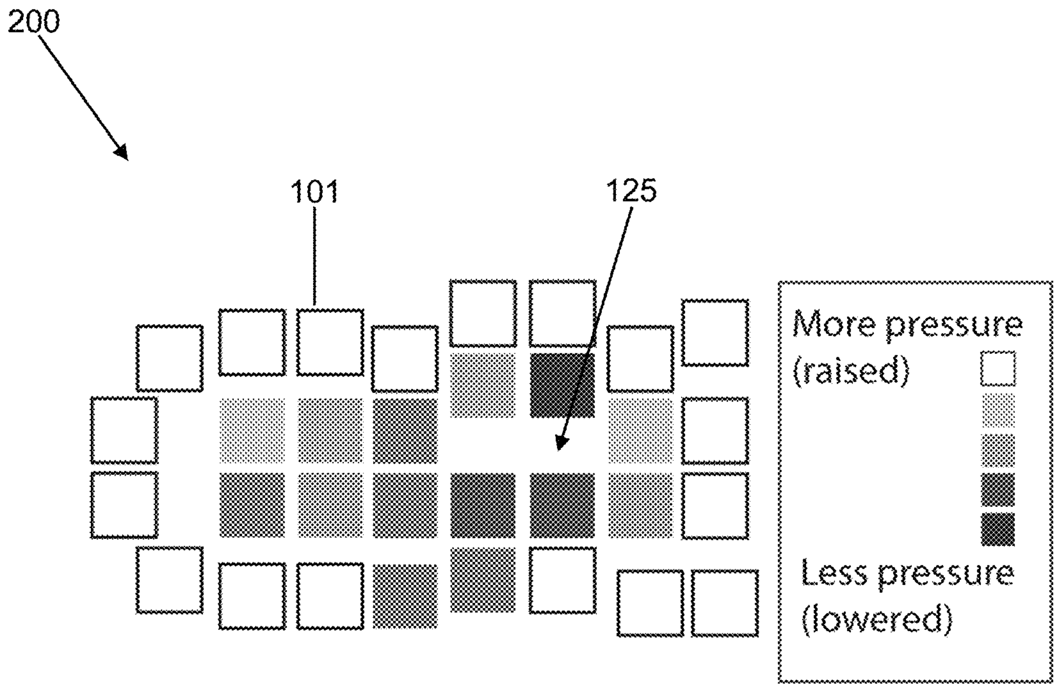
FIG. 3C is a schematic view of an array of motorized system (an example of 4×8 cushionettes: resolution: 32) in which combined XYZ axis change to accurately to fit the patient's body normal or medically required shape and skin contact points.

According to FIGS. 3A to 3C, the motorized system further enables the movement of the cushionettes along the X and Y axes. This X and Y axes movement is achieved using a folding mechanism 115, which can function as a separate symmetric or asymmetric mechanism. The linear motion actuator 120, combined with the folding mechanism 115, allows the support surface 200 to move along the X, Y, and Z axes, ensuring to conforms accurately to the patient's required shape and skin contact points. The Y-axis movement is achieved by folding mechanism or other methods well known in the art, including but not limited to scissor folds, sliding rails, and nut and screw mechanisms, which can complement the linear motion actuator 120. The folding mechanism 115 change the array of the cushionettes in XYZ axes in various position based on required shape and skin contact points.

According to FIG. 3C the X and Y axis movement can change the shape of the array of motorized cushionettes of the support surface 200 position in combined with the Z axis to accurately fit the patient's body requirements. This movement allows for creating gaps 125 between modules for various purposes, such as air drying, implementing sensors or other devices, and extending the boundaries of the motorized system.

The lack of specificity poses a significant limitation on existing air inflatable Alternating Pressure Mattresses (APMs), leading to inefficiency in their functionality. These APMs, irrespective of the patients' body position, weight, or the location of bed sores, maintain a uniform configuration on the mattress surface. In contrast, the present invention addresses this limitation by enabling the support surface to dynamically adapt to the location of bed sores. through the implementation of logical and mathematical algorithms.

Referring to FIGS. 2A and 2B again the motor 110 is selected from stepper motors equipped with feedback measurement capabilities. For instance, the Trinamic TMC2209 Stall Guard® system can provide feedback on the resistance encountered by the motor during motion to the driver. Utilizing either current or voltage feedback, the weight borne by each cushionette can be accurately measured without the need for external sensors. Alternatively, conventional pressure sensors, such as piezoelectric sensors, can be employed on individual or selected cushionettes for weight measurement purposes.

By obtaining precise weight data from each cushionette, a comprehensive map of weight distribution can be generated, recorded, and inputted into an automated intelligent algorithm or an AI-powered system. This facilitates the optimal distribution of the specific patient's body weight, enhancing the effectiveness of the mattress system in mitigating pressure-related issues.

The present invention addresses this limitation by enabling the support surface to dynamically adapt to the location of bed sores through the implementation of logical and mathematical algorithms.

The linear motion mechanism in the present invention is made of any sturdy material such as steel, aluminum of hard plastic to guarantee the weight support. An array of 128 cushionettes, bears only 580 grams of load per cushionettes for a 75 Kg patient, assuming all the weight of the body is borne by all the cushionettes.

FIGS. 4A to 4F, show a schematic view of a support surface 300 in accordance with an embodiment of the present invention. The support surface comprises an array of 128 (8×16) cushionettes. Like support surface 200 of FIGS. 2A and 2B, the motorized system comprises linear motion actuators with cushionettes corresponding to a conventionally sized user's body. The support structure 300 is divided into one or more zones. Alternatively, the zones may be defined based on the likely position of an individual on the support surface. For example, head zone 301 can be configured to receive the user's head, scapula zone 302 and leg zone 303. Adjustable sections can be arranged to generally follow the outline of the user's body in various conventional positions. The adaptive functionality of support surface 300 allows the mattress to conform to a shape tailored to the patient's specific pressure ulcer location. As illustrated in FIGS. 4A to 4F, an array of 128 (8×16) cushionettes, each capable of 100 microsteps in the Z-axis height, can theoretically assume an incredibly vast number of shapes, approaching practical infinity.

FIGS. 4A to 4C depict an example of a patient 150 with bed sores on the scapula area of both sides of the back. The ulcers are marked with X. The motorized linear actuators of the system adjust the shape to decrease pressure on the scapula zone 302 and distribute the majority of the weight to other parts of the body. The darker areas 310 indicate cushionettes at a lower height (FIG. 4B), thus applying less pressure to the affected area to facilitate accelerated healing. According to FIG. 4C, when the patient 150 is placed on the dynamically adapted shape of the support surface 300, the ulcer experiences elimination of contact pressure.

Figure 4D:
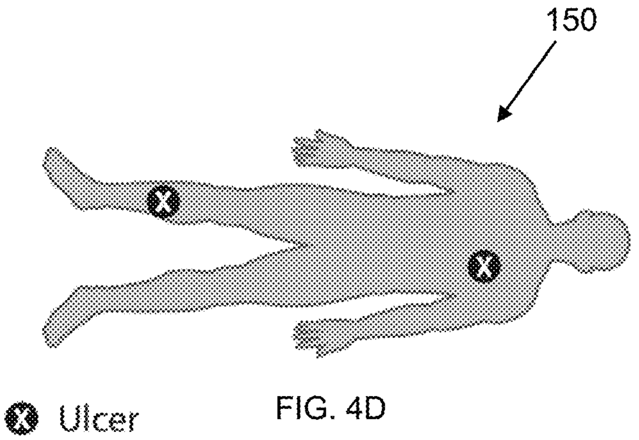
FIG. 4D is a view of a patient showing the bed sore areas.
Figure 4E:
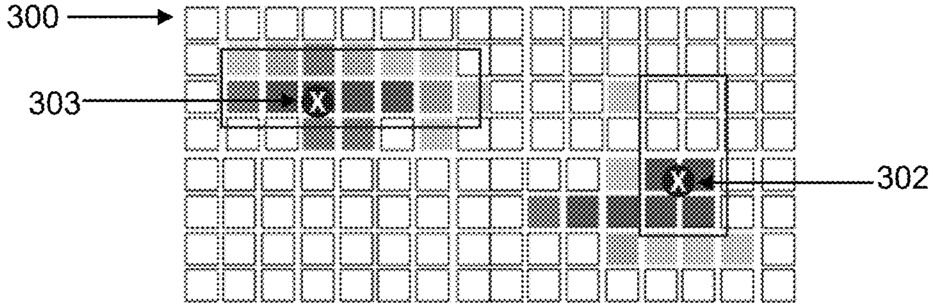
FIG. 4E is schematic view of the motorized array of cushionettes showing how the motorized array of cushionettes adjusts the pressure based on the location of the ulcer.
Figure 4F:
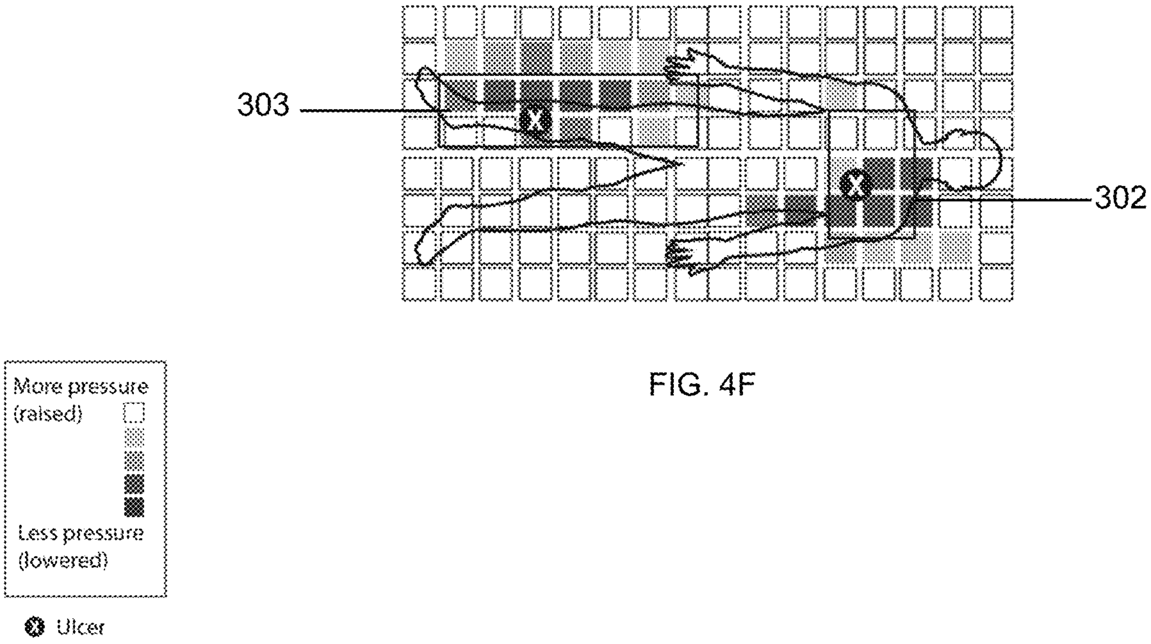
FIG. 4F is a schematic view of a patient on the motorized array of cushionettes showing how the motorized array of cushionettes adjusts the pressure based on the location of the ulcer.

FIGS. 4D to 4F illustrate another example of a patient 150 with bed sores on one side of the scapula area and another sore on the calf on the opposite side as marked with X. The mattress 300 transforms its shape to decrease pressure on both the scapula 302 and leg 303 zones, precisely reducing pressure on the ulcers. The darker zones show the cushionettes at a lower height, thus applying less pressure to the affected areas to promote accelerated healing (4E). When the patient 150 is placed on the dynamically adapted shape of the support surface 300, the ulcer experience eliminated by the contact pressure. (FIG. 4F)

FIGS. 5A and 5B illustrate another example of how the support surface 400 can manipulate surface topography to adjust the patient's body position according to their unique physiology. The motorized linear actuator and the array of cushionettes can swiftly adopt alternative shapes to reposition the patient's body as needed. In FIG. 5A, a top-view representation depicts a roll-over movement of the body position, such as shifting the patient 150 to the side for the purpose of back or genital area cleaning.

The support surface 400 can achieve these alterations in surface topography to modify the body position based on the patient's anatomy. As shown in FIG. 5B this may involve applying increased pressure to elevate cushionettes 402 in a longitudinal line beneath the right side of the patient while simultaneously lowering the cushionettes 403 on the left side to their lowest position. Such adjustments can induce the desired roll-over movement in the patient. The slow and programmed adjustment of the height of cushionettes can safely maneuver the body to assume various shapes. The system maps the body position and defines the safety boundaries. Since the body needs to roll to the left, there is a risk for the patient to slip to left. Therefore, the cushionettes on the leftmost of the body outside the boundaries, raise enough to form vertical safety grill bars 402 on the left side of the patients. The motors sequentially move for a roll-over movement and raise the cushionettes in the right order to form a sloped surface, where the body is rolled to left and is lying on the left part of it. After the patient is lied on its left, a caregiver needs access to the back of the patient for cleaning. These steps expose the patient's buttocks area for sponge cleaning. After cleaning, the bed can return to its baseline shape.

Figure 6A:
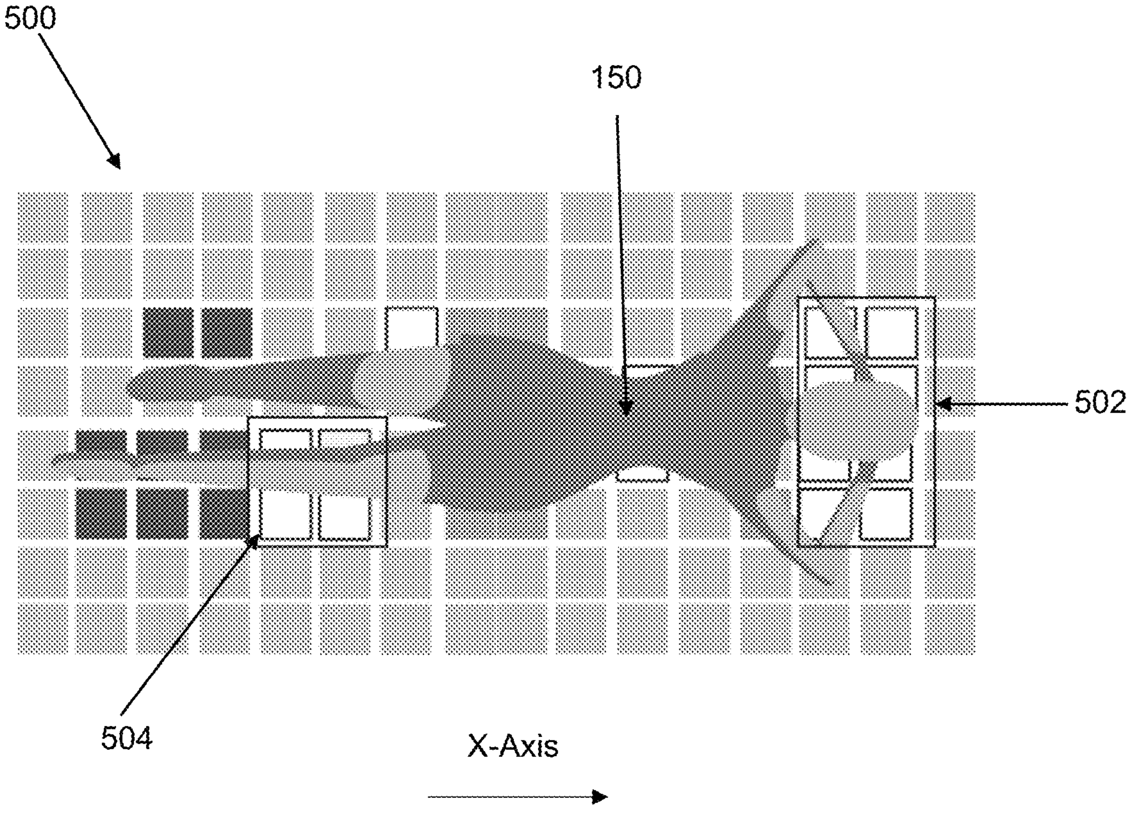
FIG. 6A shows a top view of the cushionettes while changing in surface topography of head zone and one leg zone of the patient.
Figure 6B:
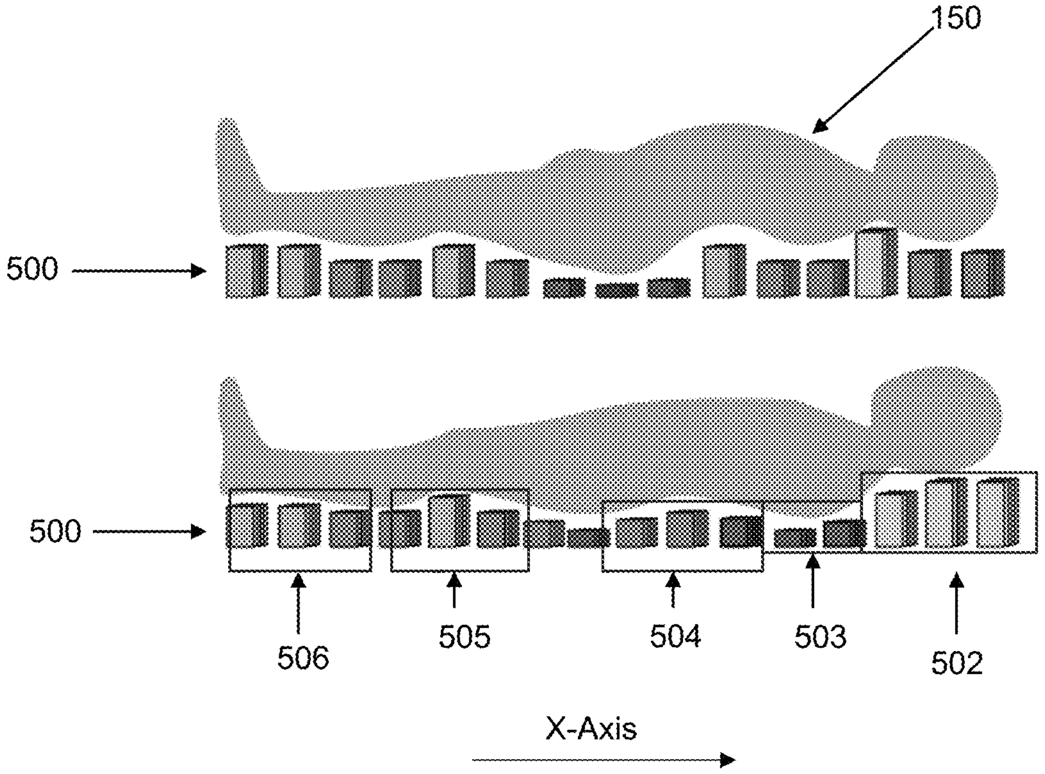
FIG. 6B shows a side view of minor surface reshaping of the cushionettes for treatment of pressure ulcer.
Figure 6C:
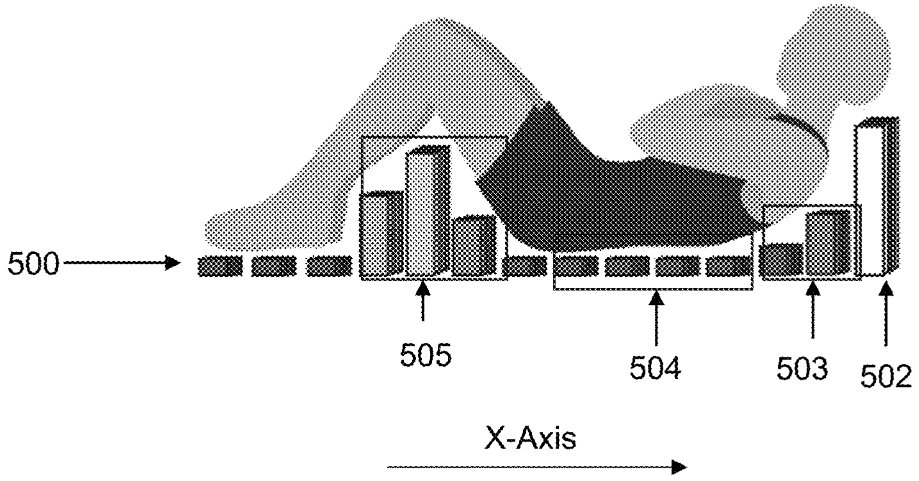
FIG. 6C shows a side view of major surface reshaping for assisted exercise.

FIGS. 6A to 6C illustrate another example of how the support surface 500 can make micrometers to centimeters of change in surface topography, specific to the patient's body 150, to re-distribute blood stream for bed sore treatment or to make the body move for assisted exercise. FIG. 6A shows a top view of the support surface 500. The support surface 500 is divided into one or more zones. Alternatively, the zones may be defined based on the likely position of an Individual on the support surface 500. In FIG. 6A the cushionettes of the head zone 502 and leg zone 504 are raised to re-distribute blood stream for bed sore treatment, while changing in surface topography.

FIG. 6B shows a side view of minor surface reshaping of the cushionettes for treatment of pressure ulcer and prevent of skin contact points for treatment and prevention of pressure ulcers. The array of cushionettes under the head 502, shoulders 503, upper back 504, knees 505 and the legs 506 can raise or lower to prevent of skin contact points and prevent of pressure ulcers. FIG. 6C shows a side view of the motorized support surface 500 while the cushionettes are continuously raised or lowered for assisted exercise purposes. The array of cushionettes under the head 502, shoulders 503 can raise or lower to perform complex movements and cushionettes under the knees 505 can raise or lower to perform bending the legs up and down for routine exercise. Assisted exercise can help prevent muscle degeneration or other complications such as deep vein thrombosis (DVT).

According to FIG. 6C again the motorized mattress can provide extended movement for any exercise such as "lying leg curl". The controller defines the boundaries of the body to implement the criteria for safety. Such safety measure can include surrounding patient's body with raised cushionette to tightly secure the body in place. The cushionettes around the body raise significantly (10-50 cm) to secure the body in place (not shown). The controller maps the location of the knees 505. The cushionettes under the knees 505 rise enough to bend the knees up to a certain amount. This height can be defined by the professionals depending on the patient's height, body shape and joints condition.

Figure 7:
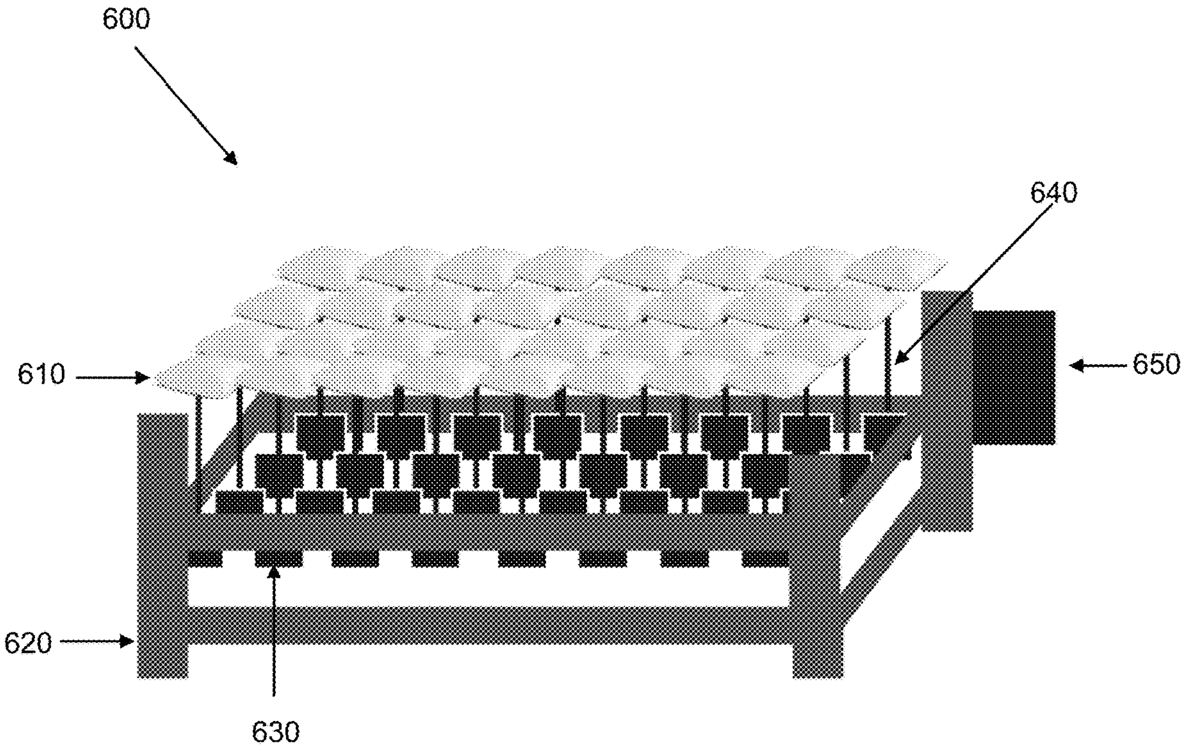

FIG. 7 shows another embodiment of a Motorized mattress-bed assembly 600. The motorized mattress-bed assembly 600 is comprised of the motorized system 610 fixed on a bed frame 620. The bed assembly 600 provides a Programmable Logic Controller unit (PLC) 650 to provide the power and control the movement of the motors 630. The motorized system 610 can be made along with a newly made bedframe 620 or could be joined to any OEM bed frames that are commercially available. Since the bed frame 620 supports the weight of motors 630 and linear motion structure 640, the bed-mattress assembly 600 can be joined together as a single system.

The PLC controller 650 can measure the weight of the patient, assign certain patterns to the support surface 610, memorize and log the topography and change it in specific intervals. The PLC controller 650 can measure the weight applied on each cushionette independently. By assigning a specific position in Z-axis to each cushionette, it can spread the weight rapidly and in high resolution and precision. The PLC controller 650 can learn the best patterns to make throughout the day by connecting to an Artificial Intelligence server or by using an embedded AI chip and software application. The PLC controller 650 can also take measurement of other additive sensors including but not limited to a thermometer, a hygrometer, a voice command unit, cameras, etc. The PLC controller 650 can assume extended function in order to optimally control of the arrayed mattress to serve its goals. Various input devices such as cameras, IR sensors, LIDARS, thermal sensors, vital signal sensors and time measurement devices can be attached to the bed assembly whether controlled through a PLC or controlled independently.

Figure 8:
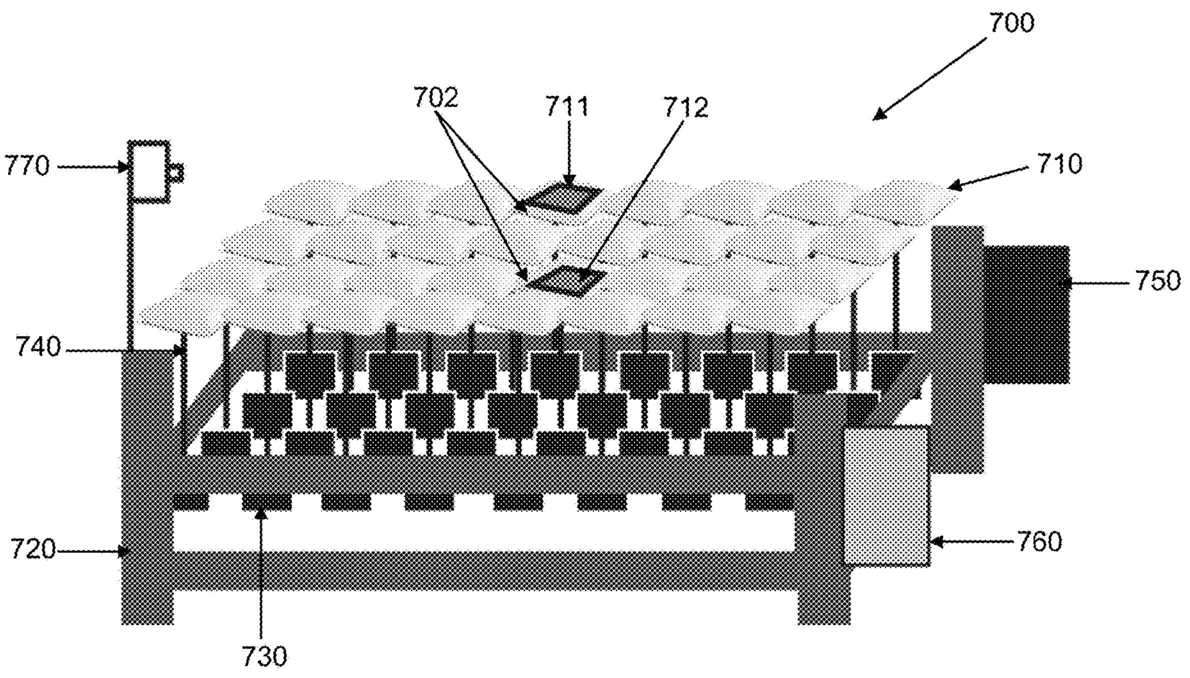

FIG. 8 shows another embodiment of an advanced Motorized mattress-bed assembly 700. The motorized mattress-bed assembly 700 is comprised of the motorized system 710 fixed on a bed frame 720. The motorized mattress-bed assembly 700 provides a Programmable Logic Controller unit (PLC) 750 to provide the power and control the movement of the motors 730. The motorized system 710 can be made along with a newly made bedframe 720 or could be joined to any OEM bed frames that are commercially available. Since the bed frame 720 supports the weight of motors 730 and linear motion structure 740, the bed-mattress assembly 700 can be joined together as a single system. The advanced Motorized mattress-bed assembly 700 comprises of multiple sensors and monitoring systems as independent add-on input devices. The input devices will provide additional information for fine-tuning the mattress function or to provide additional function commonly used for patients.

The system comprises one or more sensors 711-712. A PLC Controller 750 can be configured to communicate with the one or more sensors 711-712 and obtain data therefrom. Sensors 711-712 may be placed at any location. Various types of sensors can be implemented. For example, integrated or external sensor can be selected from various type of sensors including but not limited to pressure sensors, temperature sensors that generate information indicating ambient temperature, a pH sensor element or other biological or chemical sensors. The mattress-bed assembly 700 can comprise other types of sensors or combinations thereof, as would be apparent to persons skilled in the relevant art(s). These sensors 711-712 may be placed at zones highly susceptible to pressure injuries such as the sacrum, back of the head, elbows, shoulders, ankles, etc. In an embodiment, these sensors are placed in a location most likely to have direct or indirect contact with the cushionettes 702 likely to exert pressure.

In an embodiment, PLC controller 750 is configured to receive data from the sensors 711-712 and to determine whether adjustments should be made to support surface 710 to reduce pressure in one or more zones. Controller 750 is further configured to cause adjustments to be made to the support surface 710. A patient monitoring system 760 may be added to the motorized mattress-bed assembly. The controller 750 may be connected to the patient monitoring system 760. Patient Monitoring system 760 receives sensor data over network, and processes the data. Monitoring system 760 may store and analyze the pressure data associated with the individual sensors 711-712 and make an independent assessment of whether adjustments should be made to the support surface 710. The bed-assembly may have a camera 770 as an external device.

Figure 9:
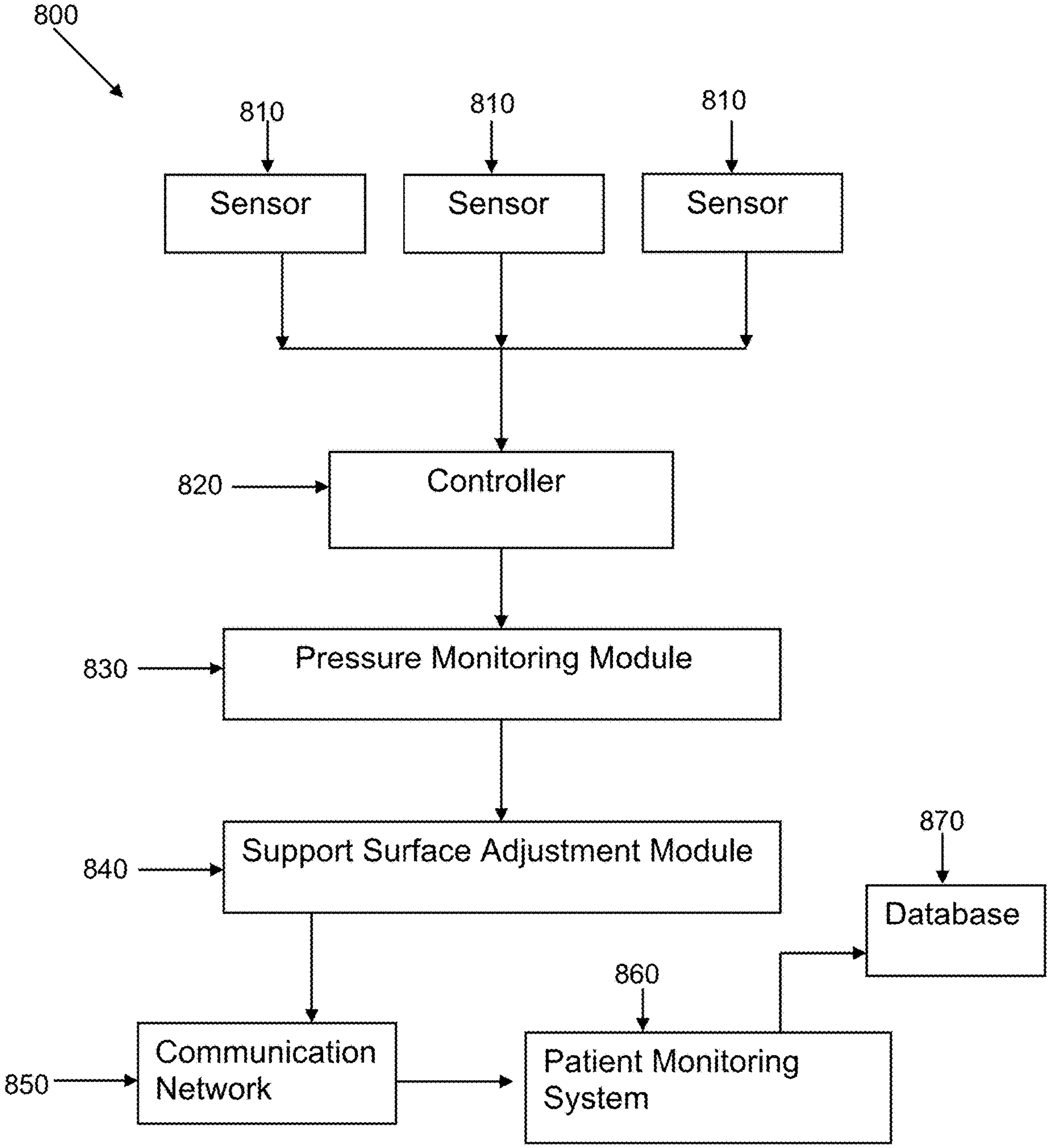

FIG. 9 is a block diagram of an illustrative embodiment for monitoring one or more pressure sensors and adjusting a support structure to accommodate for changes, in accordance with an embodiment of the present invention. The system 800 comprises sensors 810 and a PLC controller 820. The PLC controller 820 can apply various functions. The system comprises a communication network 850 coupled to the controller 820 and a patient monitoring system 860.

Communications network 850 is a publicly accessible communications network. Communications network 850 may be a wired network, wireless network, or a combination therefore. In another embodiment, communications network 850 is a private network or a hybrid network including public and private portions. Persons skilled in the relevant art(s) will recognize that various network architectures could be used for communication network 850.

Controller 820 may comprise a pressure monitoring module 830 and a support surface adjustment module 840. Pressure monitoring module 830 is configured to map the location of the patient on the surface, to determine whether a pressure adjustment needs to be made to the support surface and isolates one or more cushionettes to adjust. Pressure monitoring module 830 communicates adjustment information to support surface adjustment module 840.

Support surface adjustment module 840 is configured to adjust one or more cushionettes in the support structure. The Controller is a PLC controller comprising logic to determine the amount of adjustment to make to a specific cushionette.

Monitoring system 860 receives sensor data over network 850, and processes the data. Monitoring system 860 may store and analyze the pressure data associated with the individual sensor 810 and make an independent assessment of whether adjustments should be made to the support surface. The monitoring system 860 may comprise a database 870 to store Records for individuals for healthcare providers. A healthcare provider may determine, if medical intervention is necessary based on sensors, controller, and/or monitoring system.

The patient monitoring system 860 is a real-time patient monitoring system equipped with various sensors that provides an intelligent high efficiency "patient specific" solution for preventing and healing bed sores. The system of the present invention is aware of the location and the extent of the touch between the skin and the surface through sensors (camera, piezo, thermometer, hygrometer, etc.) or by native current feedback to the motors or any other technology that provides such means. The system can measure the result of the previous status of the patient and learn to improve the alternating pressure algorithm. The feedback mechanism can actively measure the exposure time and pressure and decide what part of the support surface should change pattern for a specific patient with a specific body shape. The system can benefit from predefined algorithms or learn by training Artificial Intelligence to adapt the patients' situations individually or provide personalized treatment. The present invention is an active system that adjusts the points of contact through feedback and re-adjusts the spread of pressure on the total area of the mattress.

The pattern of the appearance of bed sores on the body is different in every patient and depends on the type of disability, the anatomy of the person and the assistance provided, thus the system can have an integrated digital algorithm powered solution (such as Artificial Intelligence) that can "watch" for the development of the bedsore and decide to change the pressure pattern or to keep with a pre-programmed system.

The method for adjusting the modular support surface comprising of steps of:

a) obtaining pressure data from one or more sensors placed on the plurality of cushionettes of the support surface;
b) generating a comprehensive map of pressure distribution on the modular support surface;
c) inputting the comprehensive map of the pressure distribution into an automated intelligent algorithm or an AI-powered system;
d) determining by the AI-powered system whether the pressure data needs adjustment, and
e) moving the plurality of linear actuators to a specified heights to provide an alternate pressure distribution on a body of a patient, wherein the AI-powered system is configured to identify a patient's body position and boundaries on the modular support surface and define the one or more cushionettes of the modular support surface to be adjusted.

The AI-powered system is trained using a set of images obtained from a user or using a set of bedsore locations of a large number of patients and adjust the pressure distribution over a pre-defined period of time after an initial adjustment is made to prevent formation of ulcers.

Figure 10A:
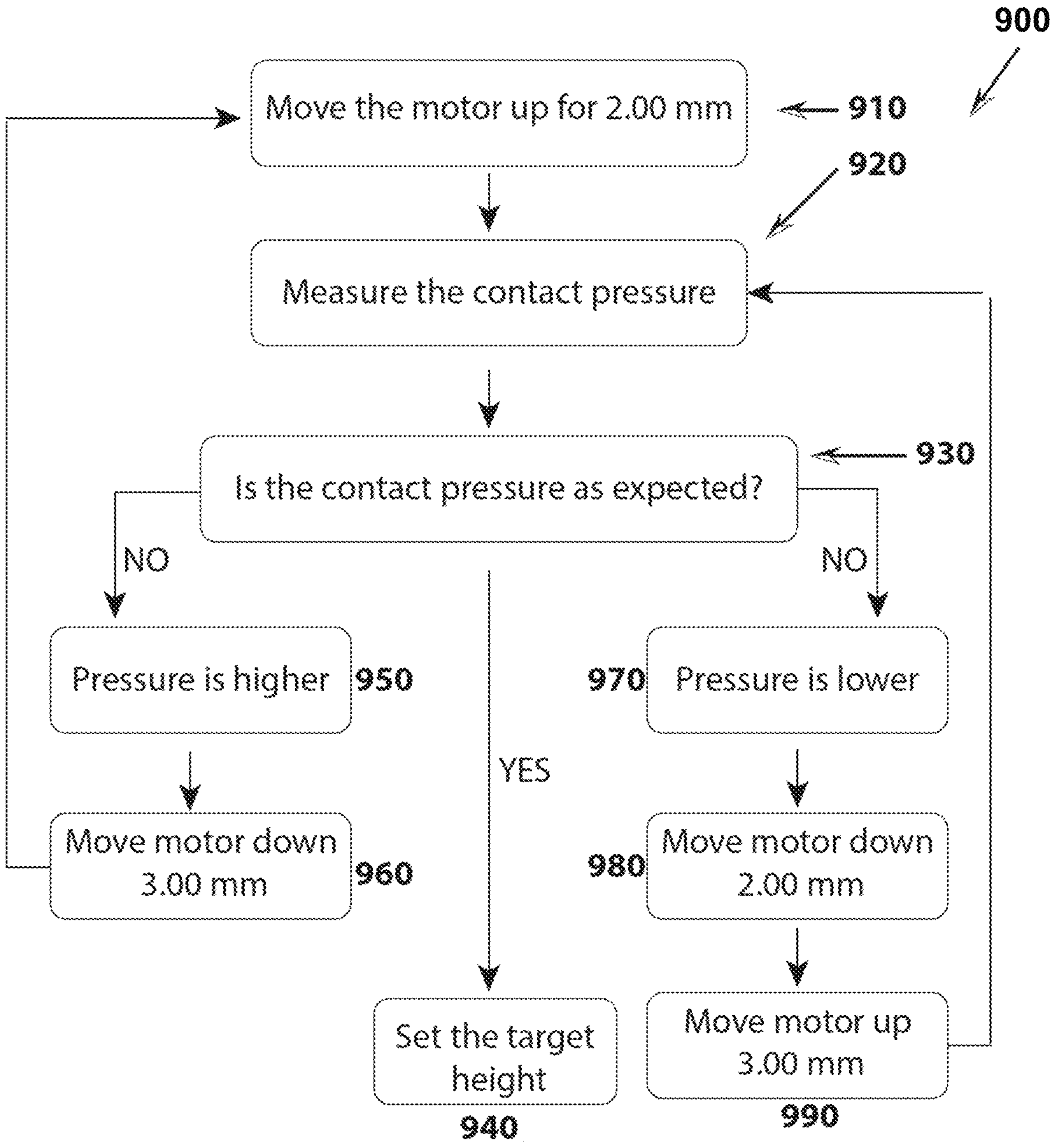
FIG. 10A is a flowchart showing the relationship between the height of the cushionette and the contact pressure according to the present invention.

FIG. 10A is a flowchart 900 showing the relationship between the height of the cushionette and contact pressure. The higher the cushionette is, the more pressure is felt by the pressure sensor. The controller system can use a template to distribute the weight of the patient on each cushionette. To measure if the desired pressure is achieved, the motors raise the cushionette to a specific height 910 and measure the pressure 920. If the pressure is achieved 930, then that specific height is saved as the target height 940. If the pressure is lower 970, then the motor moves back 980 and raises again to a higher point 990. The pressure is remeasured and the process is iterated until the correct target height of the motor is achieved. If the pressure is higher 950 the steps 910-960 are iterated to achieve the target pressure. Such dynamic system adjusts the pressure based on the current weight and location of the patient's body and "personalizes" the treatment for the patients.

Figure 10B:
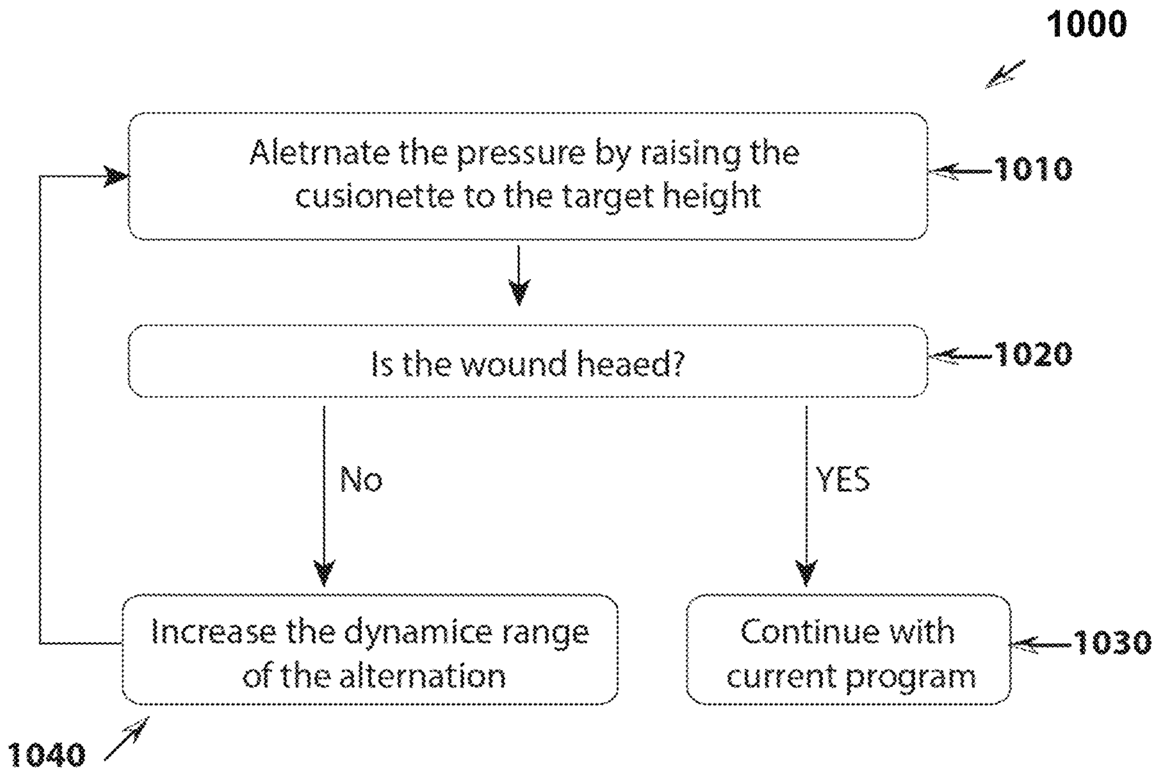
FIG. 10B is a flowchart showing how dynamic system alternating pressure can adapt to improve the treatment.

FIG. 10B. is a flowchart 1100 showing how a dynamic system of alternating pressure can adapt to improve the treatment. If by alternating pressure through a pre-defined program 1010-1020 the wound does not heal, then the dynamic range of the cushionette heights can increase 1040 to make a more prominent pressure effect. If the current program is suitable then is sustained 1030.

Figure 11:
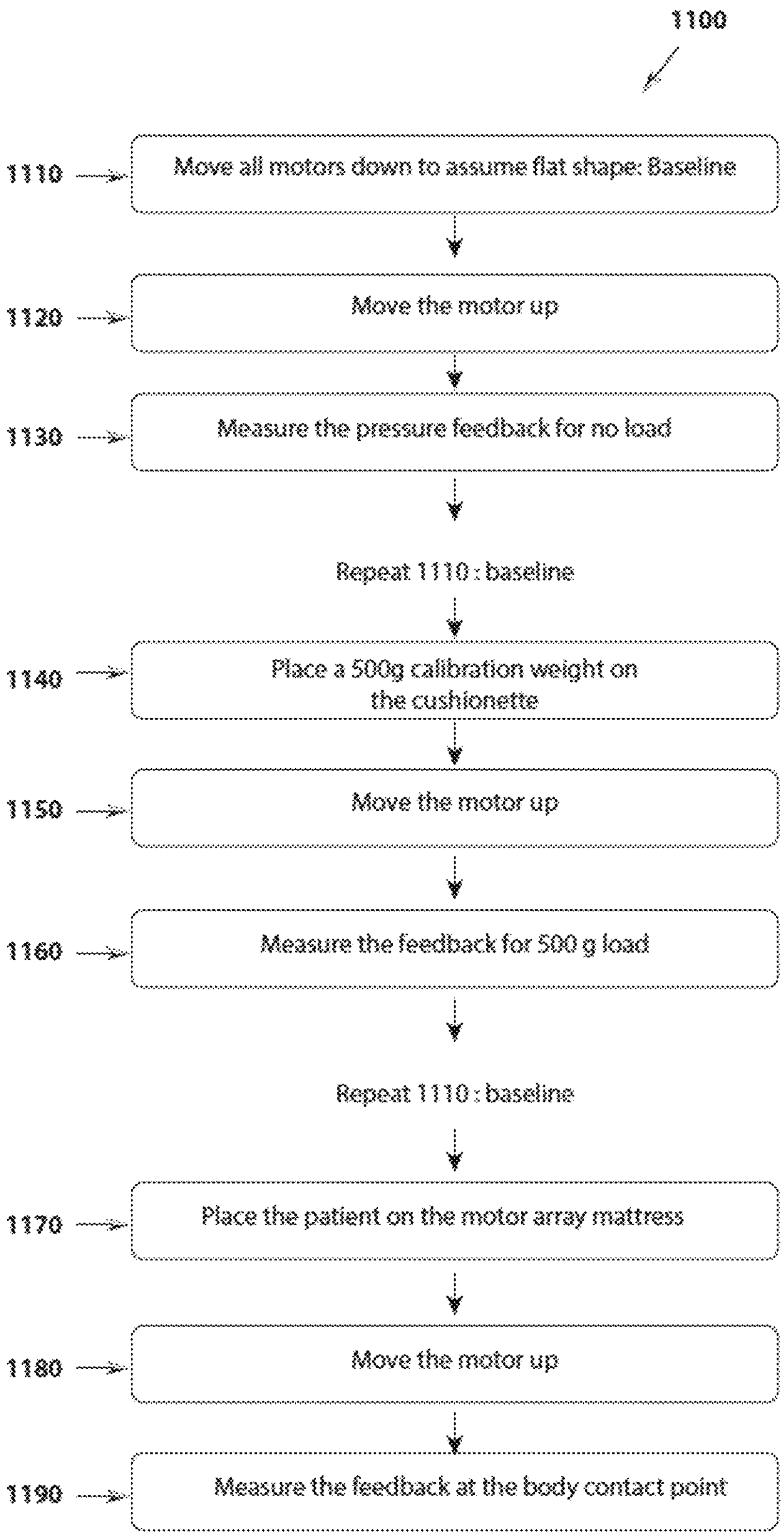

FIG. 11. is a flowchart 1100 of a method of measuring the pressure of the contact point through the motor feedback. This pressure sensing technique uses the electrical feedback signal received from the motors to calculate the pressure applied on a single cushionette. The feedback electrical signal includes but is not limited to the current, the voltage, the impedance, the resistance or a combination of all. In step 1110 the system moves all of the motors down to establish a baseline of the position of each cushionette at height zero. The position of zero can be assigned by electrical signal through a mechanical endstop sensors that signal the position of the surface by contact, by using IR or visible sensors or by other mechanism such as StallGuard by Trinamics which signals the position of the motor shaft through measuring the motor's feedback electrical signal.

In step 1120-1130 the system moves every motor about 5-10 cm and records the feedback electrical signal in the status of no load on the motor. In the next step 1140, the system goes back to the Baseline position. In next steps 1150-1160 the user places a calibration weight of 500 g on the cushionette and the system moves the motor upwards again and measures the electrical feedback when a 500 g load is born by the motor. In step 1170 the patient is lied on the motorized mattress and in step 1180-1190 the system records the electrical feedback. The pressure applied to the specific contact point after the patient is lied on the bed is measured by the following formula:

Patient body pressure=(Pressure at the body contact point 1190−Pressure at no load 1130)×(Pressure for 500 g load 1160−Pressure at no load 1130)

Figure 12A:
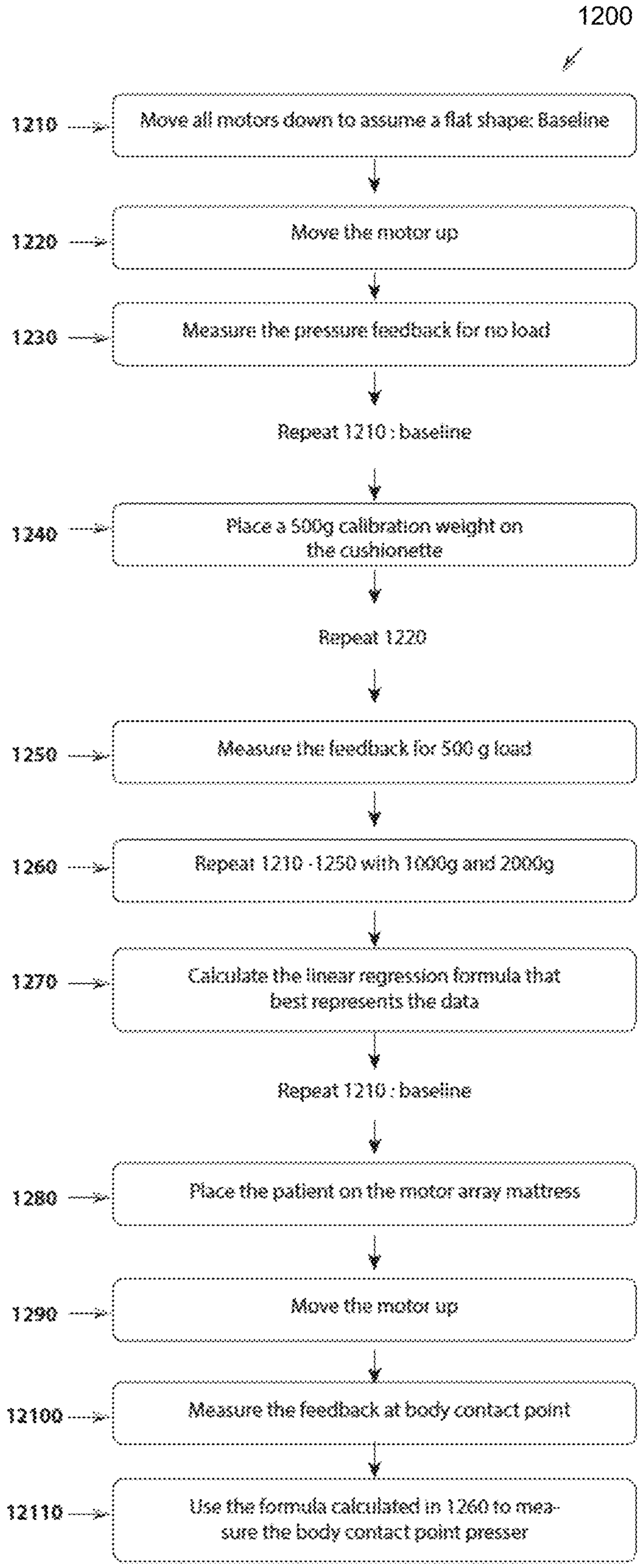
FIG. 12A is a flowchart showing how the system can calibrate each of the linear motion mechanism using the motor response as feedback signal and calibration curve.

FIG. 12A is a flowchart that shows a multipoint pressure sensing calibration in which the system can calibrate the pressure sensing by multiple measurement of the motor feedback 1200. In step 1210 the motor array moves down to make a flat Baseline as the reference point. In steps 1220-1230 the system will measure the motor feedback with no load. Then in steps 1240-1260 the system will measure the motor feedback using a 500 g, a 1000 g and a 2000 g calibration standard and finds the relationship between the motor feedback 1270 in a range of 0-2,000 g. This range can be extended as needed by the user or by the manufacturer. In steps 1280-12100 the patient is lied on the mattress and the contact pressure is measured using the linear regression formula calculated in step 1270. Such multipoint calibration can be performed by the manufacturer at the point of production for hard calibration or for troubleshooting. In step 12110 The body contact point pressure is calculated by the formula used in step 1260.

Figure 12B:
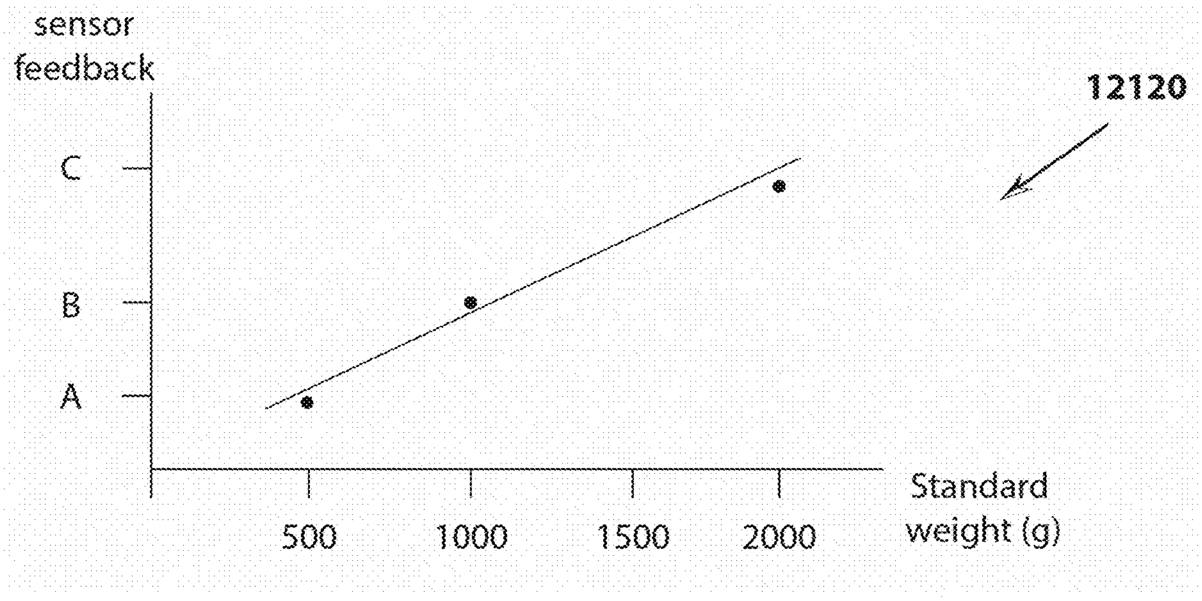
FIG. 12B is a flowchart showing how the system can calibrate each of the linear motion mechanism using a calibration curve and linear regression.

The FIG. 12B. shows graph 12120 which is an example of the plot to computationally calculate the trendline and the formula of the relationship between the motor feedback and the contact pressure using multiple load measurements with each motor. Each motor can make a dedicated calibration curve for maximum accuracy.

Figure 13:
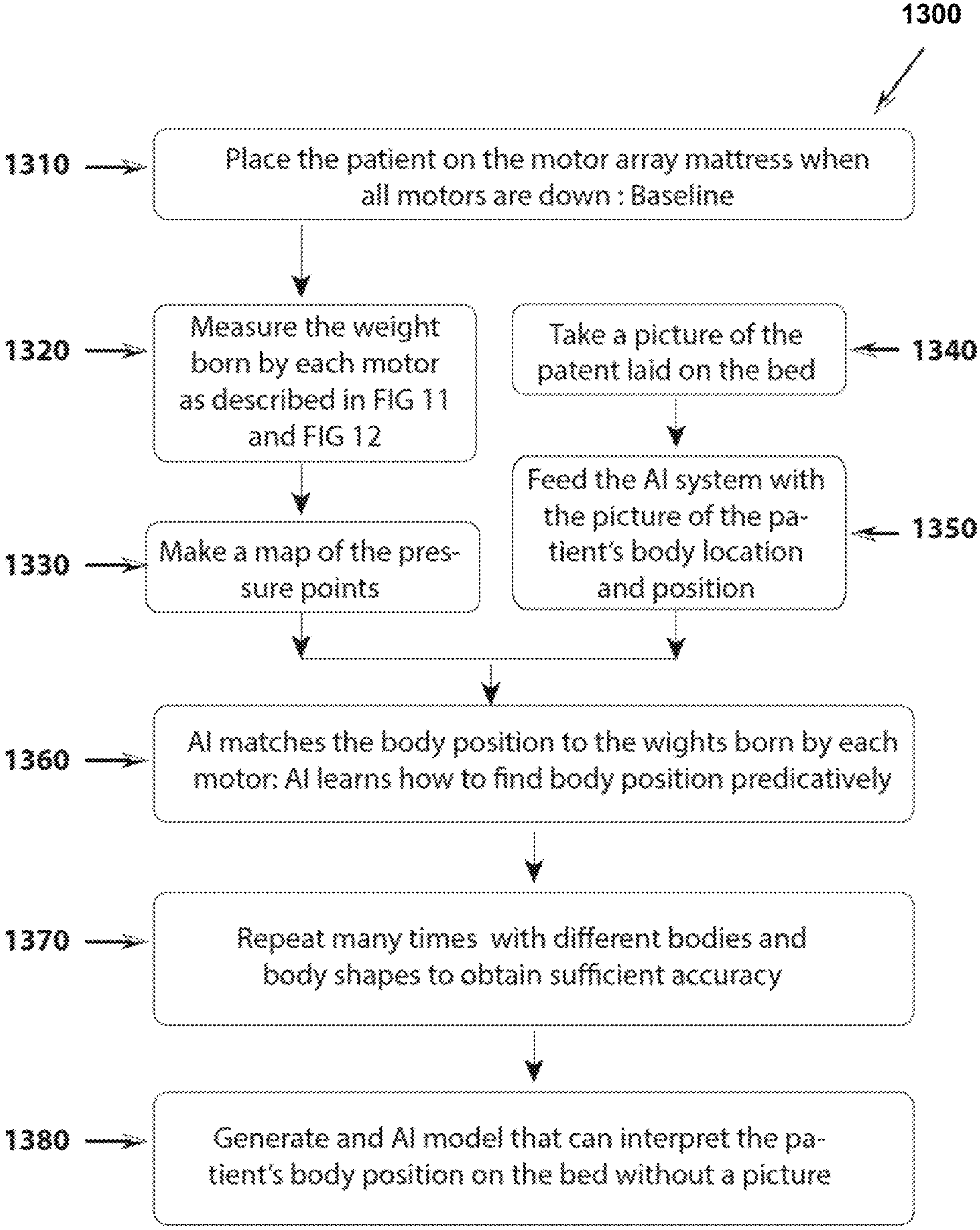
FIG. 13 is a flowchart showing how the system can learn to find the position of patient's body on the array of motors using the motor response as a feedback signal.

FIG. 13. is a flowchart 1300 describing the steps using of which the controller unit can understand the location (XY axis) of the patient's body on the mattress and its position (the shape of the body such as laid, bend, legs bent, etc.). The controller is able to interpret the body position and location through AI modeling if it is previously provided by a training set of data such as picture of human body in different position on different locations on the mattress. The advantage of such AI enabled system is that the mattress is aware which part of the body has contact to which motorized support array, hence adjusting the pressure accurately on the affected area. This method is used at the point of development to generate an AI model and can use normal individuals to participate in generating data instead of real patient, in order to increase the volume of training data for AI modeling.

In step 1310 an individual is lied down on the bed when all motors are down in the Baseline. In step 1320 all motors raise slightly to measure the contact pressure of each cushionette with the body, as described before, in the Baseline. The system can now generate a map of the body contact point on the mattress 1330.

Separately, in step 1340 a picture of an individual lying on the bed is taken and in step 1350 is fed to the AI engine as the training set. In step 1360 the AI engine will combine the pressure map with the picture taken from individuals lying on the bed to learn the body position and location using only the pressure map. This process can be repeated many times in step 1370 until the system shows sufficient accuracy defined by standards elsewhere. If approved, the AI assisted positioning model is saved in step 1380 on the storage of the system or on the server to be used for real patients.

Figure 14:
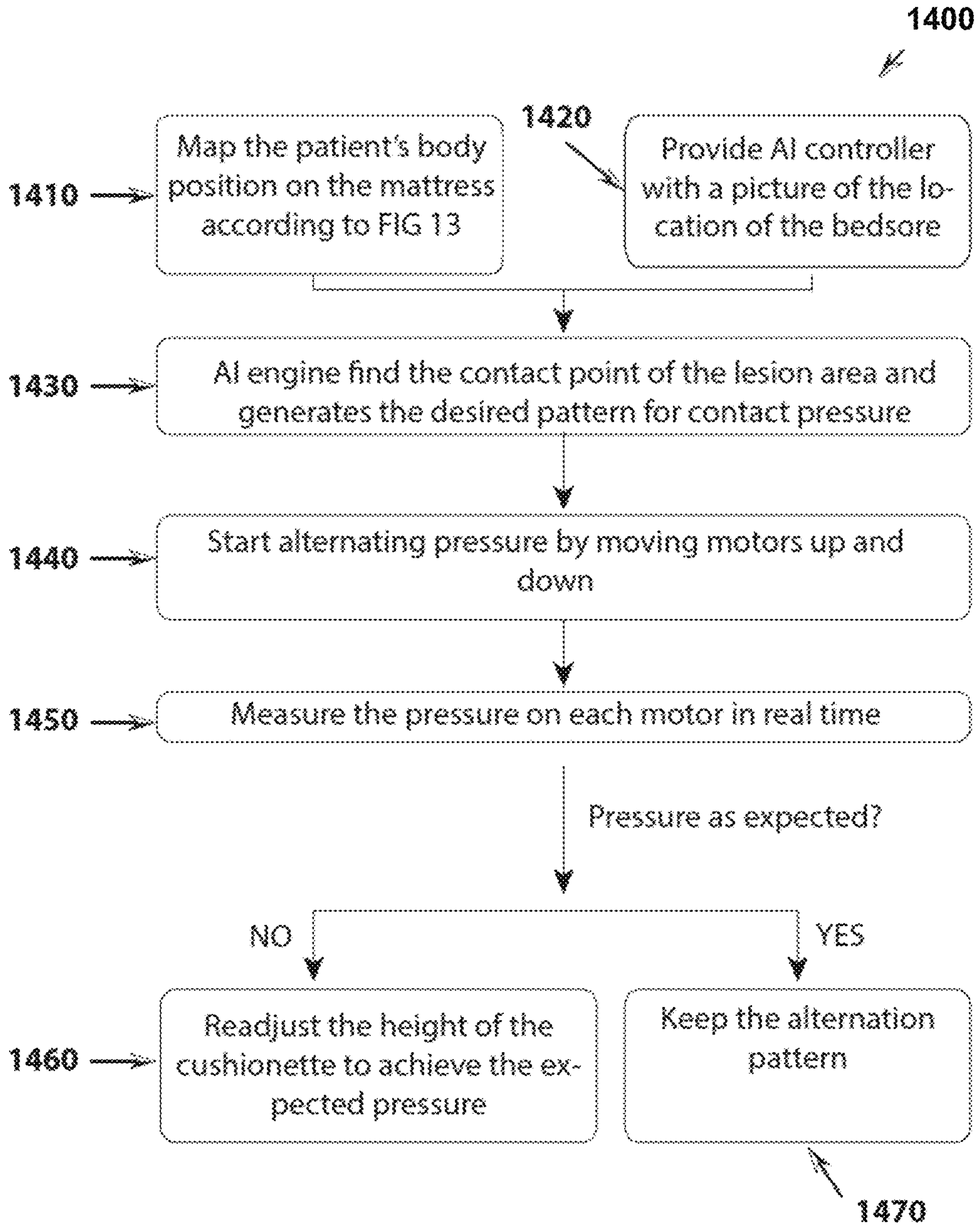
FIG. 14 is a flowchart showing how the system adjusts the alternating pressure to the patient's lesion location.

FIG. 14 is a flowchart of a method that describes how the system can adjust pressure on the bedsore area 1400. In step 1410 the patient's body on the mattress is mapped according to the method described above. Then, in step 1420 a picture of the patient's body that includes the bedsore area is taken and is fed to the AI engine. In 1430 the AI engine will understand which cushionettes are located around the bed sore and generates a pattern in which the alternating pressure applies lower pressure on the affected area and higher pressure on other parts of the body.

In Step 1440, the motors move up and down to apply the alternating pressure, considering lower pressure around the bed sore, using the pressure map generated in step 1430. At the same time, in step 1450, the system constantly monitors the pressure on each motor. As in step 1460, if the motors do not show the expected pressure after moving to the calculated height, the system can re-adjust the height until it achieves the expected pressure. If pressure is good as in step 1470 the alternating pattern continues.

Figure 15:
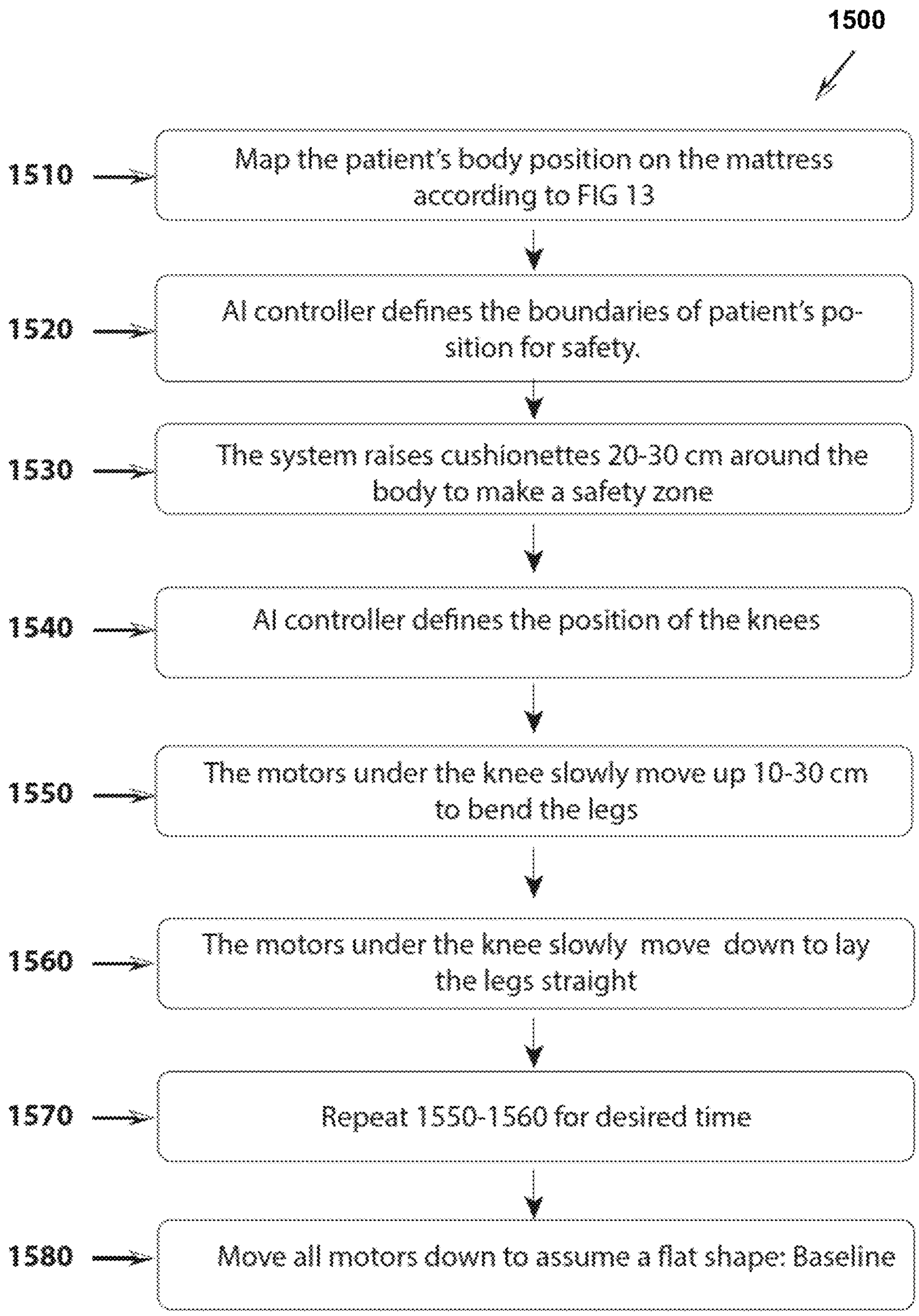
FIG. 15 is a flowchart showing how the system provides routine leg bending exercise according to the present invention.

FIG. 15 is a flowchart 1500 of a method where the motorized mattress can provide extended movement for any exercise such as "lying leg curl". In step 1510 the mattress maps the patient's body on the mattress according to the method described above. In step 1520 the AI controller defines the boundaries of the body to implement the criteria for safety. Such safety measure can include surrounding patient's body with raised cushionette to tightly secure the body in place (FIG. 6C).

In step 1530, the cushionettes around the body raise significantly (10-50 cm) to secure the body in place. In step 1540 the AI controller maps the location of the knees according to the method described above. In step 1550 the cushionettes under the knee rise enough to bend the knees up to a certain amount. This height can be defined by the professionals depending on the patient's height, body shape and joints condition. Then the motors go back to position zero in step 1560 to straighten the leg.

According to step 1570, the steps 1550-1560 can be repeated as described before. At the end of the exercise, step 1580, all motors move down to place the motorized mattress in a Baseline flat shape.

Figure 16:
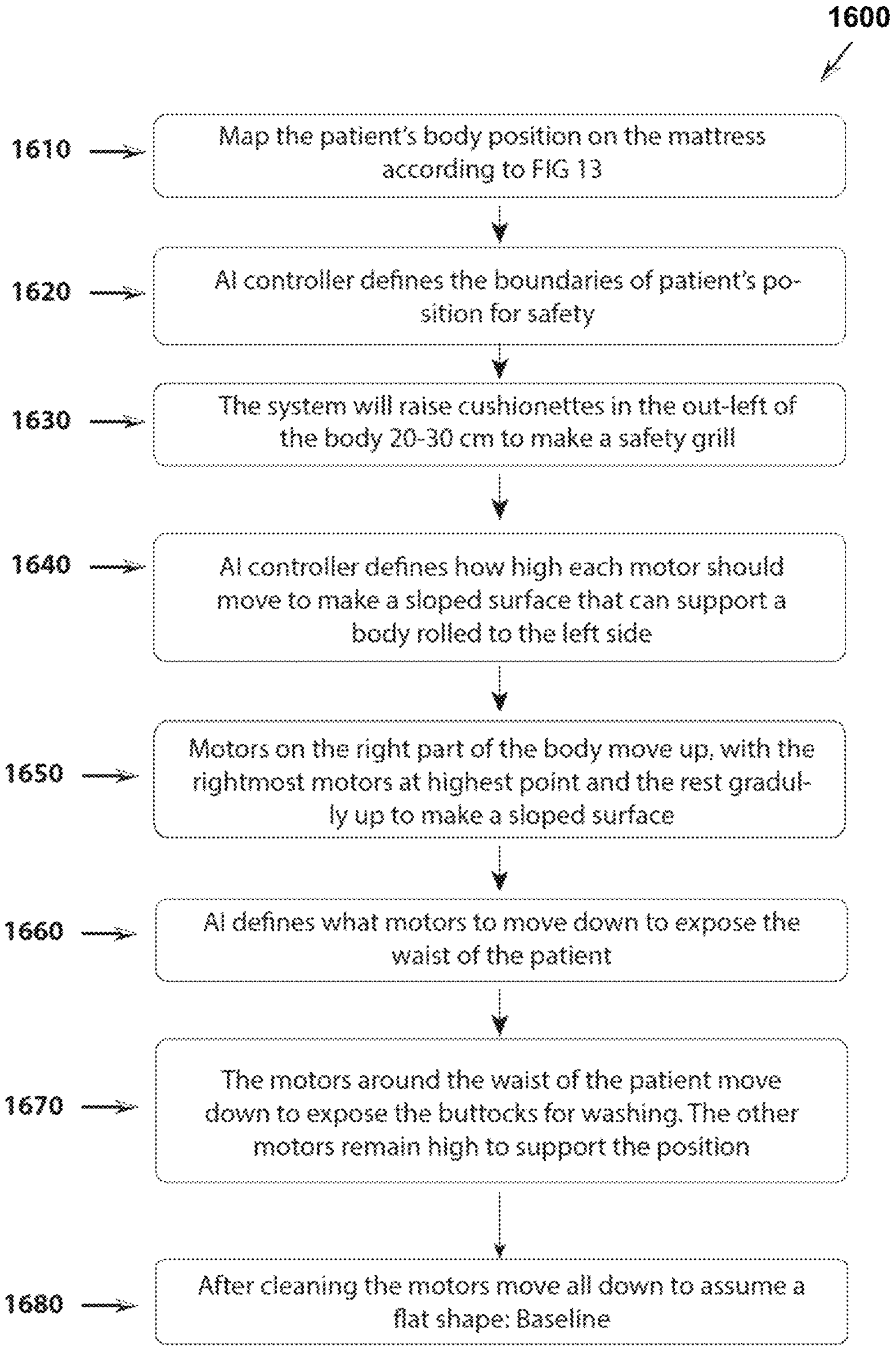
FIG. 16 is a flowchart showing how the system rolls the patient's body to the left for hygienic cleaning.

FIG. 16 is a flowchart describing the system performing additional movement to adapt a shape in which the patient can be rolled over to the side for cleaning their back 1600. The slow and programmed adjustment of the height of cushionettes can safely maneuver the body to assume various shapes. In step 1610-1620, the system maps the body position and defines the safety boundaries as described above. Since the body needs to roll to the left, there is a risk for the patient to slip to left. Therefore, in step 1630, the cushionettes on the leftmost of the body, outside the boundaries, raise enough to form vertical safety grill bars on the left side of the patients. (FIG. 5B).

In step 1640 the software defines what is the best strategy to move the motors sequentially for a roll-over movement. According to step 1650, raising the cushionettes in the right order, can result in forming a sloped surface, where the body is rolled to left and is lying on the left part of it. After the patient is lied on its left, a caregiver needs access to the back of the patient for cleaning. Therefore, in step 1660-1670, the AI system finds which cushionettes should move down and applies the movement. These steps expose the patient's buttocks area for sponge cleaning. After cleaning, the bed can return to its baseline shape according to the step 1680.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A mattress system comprising:

a) a support surface to support a body of a user, comprising a plurality of cushionettes, wherein the plurality of cushionettes define a resolution of the support surface, and the support surface is divided into a plurality of zones, wherein each of the plurality of zones is defined by a set of cushionettes in contact with a part of the body of the user;

b) an array of moving linear actuators placed below the support surface, wherein each moving linear actuator comprising: an upright shaft defining a Z-axis and having a distal end coupled to a cushionette and a proximal end coupled to a motor, wherein each moving linear actuator is configured to move a corresponding cushionette along the Z-axis to adjust a height of each corresponding cushionette;

c) a folding mechanism for the movement of the plurality of cushionettes along an X-axis and a Y-axis, perpendicular to the Z-axis and parallel to the support surface, wherein the folding mechanism changes locations of the plurality of cushionettes in the X and Y axes;

d) a plurality of sensors, each sensor configured to measure a pressure exerted on each of the plurality of cushionettes, wherein at least one sensor is provided in each of the plurality of zones, and e) a controller unit configured to control the operation of said array of moving linear actuators and to communicate with the plurality of sensors and obtain data therefrom and to determine whether adjustments are to be made to the support surface to reduce or increase pressure in one or more zones of the plurality of zones, whereby the mattress system can measure a weight of the user, assign a plurality of topography to the support surface, memorize and log each topography and change it in specific intervals, measure the weight applied on each cushionette independently and assign a specific height in the Z-axis to each cushionette, thereby, spread the weight in high resolution and precision on the cushionettes, elevating or lowering each zone of the plurality of zones under the body of the user to alleviate pressure and disconnect the affected skin from the mattress system.

2. The mattress system of claim 1, wherein the plurality of sensors are pressure sensors.

3. The mattress system of claim 2, wherein the pressure sensors are piezoelectric sensors.

4. The mattress system of claim 1, wherein the controller unit is a Programmable Logic Controller unit (PLC).

5. The mattress system of claim 1, further having a patient monitoring system coupled to the controller unit, said patient monitoring system configured to receive and analyze a set of pressure data associated with each of the plurality of sensors, wherein the patient monitoring system makes an independent assessment of an adjustment to be made to the support surface.

6. The mattress system of claim 1, wherein the controller unit comprising:

a) a pressure monitoring module configured to determine whether a pressure adjustment needs to be made to the support surface and isolate one or more cushionettes of the plurality of cushionettes, and b) a support surface adjustment module configured to adjust one or more cushionettes of the plurality of cushionettes in the support surface, wherein the pressure monitoring module communicates adjustment information to the support surface adjustment module.

7. The mattress system of claim 1, wherein the motor is a stepper motor equipped with a feedback measurement system.

8. The mattress system of claim 1, wherein the motor is selected from the group consisting of an electric motor, a magnetic motor, a DC motor, a servo motor, and a stepper motor.

9. The mattress system of claim 1, wherein the plurality of sensors further comprising temperature sensors that generate information indicating ambient temperature, pH sensors, biological sensors and chemical sensors.

10. The mattress system of claim 1, wherein each moving corresponding cushionette of each moving linear actuator has a square, an oval, a spherical or a cylindrical shape.

11. The mattress system of claim 1, further having a thermometer, a hygrometer, a voice command unit, and/or cameras.

12. The mattress system of claim 1, wherein the folding mechanism is selected from a group consisting of scissor folds, sliding rails, or a nut and screw mechanism.

13. A method for manipulating a support surface of a modular mattress system to facilitate rolling or sliding a user, comprising:

a) mapping a body position of the user by a controller;

b) defining boundaries of the body of the user by the controller to implement a criteria for safety;

c) applying increased pressure by a plurality of motors to elevate a first array of cushionettes arranged in a longitudinal line beneath one side of the user and raise the cushionettes to form a vertical safety grill bars on one side of the user;

d) lowering a second array of the cushionettes positioned opposite the first array to their lowest position forming a sloped surface to roll the body of the user, whereby, the slow and programmed adjustment of a height of cushionettes can safely maneuver the body of the user to assume various shapes for various care actions such as the purpose of cleaning, bathing, feeding and massaging.

14. The method of claim 13, wherein the controller is a AI controller.

* * * * *